US009965547B2

(12) United States Patent
Keyngnaert et al.

(10) Patent No.: US 9,965,547 B2
(45) Date of Patent: May 8, 2018

(54) SYSTEM AND METHODS FOR AUTOMATING TRADEMARK AND SERVICE MARK SEARCHES

(71) Applicant: Camelot UK Bidco Limited, London (GB)

(72) Inventors: Peter Keyngnaert, Landegem (BE); Jan Waerniers, Aalter (BE); Ann Smet, Stekene (BE); Christoph Liekens, Berchem (BE); Jan Schietse, Melle (BE)

(73) Assignee: Camelot UK Bidco Limited, London (GB)

( * ) Notice: Subject to any disclaimer, the term of this patent is extended or adjusted under 35 U.S.C. 154(b) by 391 days.

(21) Appl. No.: 14/702,209

(22) Filed: May 1, 2015

(65) Prior Publication Data
US 2015/0324469 A1 Nov. 12, 2015

Related U.S. Application Data

(60) Provisional application No. 61/990,859, filed on May 9, 2014, provisional application No. 61/990,865, filed on May 9, 2014.

(51) Int. Cl.
*G06F 17/30* (2006.01)

(52) U.S. Cl.
CPC .... *G06F 17/30634* (2013.01); *G06F 17/3053* (2013.01); *G06F 17/30554* (2013.01); *G06F 17/30867* (2013.01)

(58) Field of Classification Search
CPC ......... G06F 17/30634; G06F 17/30867; G06F 17/3053; G06F 17/30554

(Continued)

(56) References Cited

U.S. PATENT DOCUMENTS 4,972,349 A * 11/1990 Kleinberger ........ G06F 17/3061
6,629,092 B1 * 9/2003 Berke ............... G06F 17/30864
707/706

(Continued)

FOREIGN PATENT DOCUMENTS

CN 1581159 A * 2/2005

OTHER PUBLICATIONS

Eakins et al., "Similarity Retrieval of Trademark Images", published in IEEE MultiMedia, vol. 5, Issue 2, Apr.-Jun. 1998, pp. 53-63.*

(Continued)

*Primary Examiner* — Phuong Thao Cao
(74) *Attorney, Agent, or Firm* — McCarter & English, LLP; Sean R. MacDavitt

(57) ABSTRACT

Exemplary embodiments of the present disclosure provide for extraction data from one or more repositories in response to an electronic search order including a text-based input string, a list of jurisdictions, and a list of international classes. Conditional logic of one or more rules is executed to process the search order, and the search order is transformed into one or more queries based on execution of the conditional logic of the one or more rules. A set of data is retrieved from the one or more repositories using the one or more queries to generate search results, where the set of trademarks retrieved can be limited to the list of jurisdictions and the list of international classes identified in the search order. At least a portion of the search results are transmitted to a user computing device to be rendered in a graphical user interface of a display device associated with the user computing device.

17 Claims, 18 Drawing Sheets

(58) Field of Classification Search
USPC .......................................................... 707/706
See application file for complete search history.

(56) References Cited

U.S. PATENT DOCUMENTS

| | | | | |
|---|---|---|---|---|
| 7,346,605 | B1* | 3/2008 | Hepworth | G06Q 10/00 |
| 7,761,438 | B1* | 7/2010 | Bober | G06K 9/48 |
| | | | | 707/706 |
| 7,966,369 | B1* | 6/2011 | Briere | G06Q 10/10 |
| | | | | 707/616 |
| 8,332,388 | B2* | 12/2012 | Chaudhuri | G06F 17/30463 |
| | | | | 707/718 |
| 9,602,585 | B2* | 3/2017 | Falkenberg | G06F 17/30634 |
| 2003/0158743 | A1* | 8/2003 | Havlick | G06Q 10/10 |
| | | | | 705/310 |
| 2004/0220903 | A1* | 11/2004 | Shah | G06F 17/30876 |
| 2004/0225643 | A1* | 11/2004 | Alpha | G06F 17/3064 |
| 2005/0267871 | A1* | 12/2005 | Marchisio | G06F 17/30672 |
| 2007/0073736 | A1* | 3/2007 | Goetz | G06F 17/227 |
| 2007/0203863 | A1* | 8/2007 | Gupta | G06N 99/005 |
| | | | | 706/20 |
| 2008/0033822 | A1* | 2/2008 | Merdinger | G06Q 30/02 |
| | | | | 705/14.41 |
| 2008/0065611 | A1* | 3/2008 | Hepworth | G06F 17/30864 |
| 2008/0243785 | A1* | 10/2008 | Stading | G06F 17/30867 |
| 2008/0243799 | A1* | 10/2008 | Rozich | G06F 17/30864 |
| 2008/0244429 | A1* | 10/2008 | Stading | G06F 17/30554 |
| | | | | 715/764 |
| 2009/0299731 | A1* | 12/2009 | Owen | G06F 17/30681 |
| | | | | 704/9 |
| 2011/0084854 | A1* | 4/2011 | Johnson | G08G 1/087 |
| | | | | 340/909 |
| 2011/0225019 | A1* | 9/2011 | Taylor | G06F 17/30864 |
| | | | | 705/7.28 |
| 2011/0314000 | A1* | 12/2011 | Chaudhuri | G06F 17/30463 |
| | | | | 707/718 |
| 2012/0144499 | A1* | 6/2012 | Tan | G06Q 10/00 |
| | | | | 726/26 |
| 2012/0158724 | A1* | 6/2012 | Mahadevan | G06F 17/30873 |
| | | | | 707/737 |
| 2012/0197653 | A1* | 8/2012 | Short | G06Q 30/0201 |
| | | | | 705/1.1 |
| 2013/0055390 | A1* | 2/2013 | Bennett | G06F 17/30864 |
| | | | | 726/22 |
| 2013/0097134 | A1* | 4/2013 | Thompson | G06F 17/30911 |
| | | | | 707/696 |
| 2013/0198217 | A1* | 8/2013 | Narula | G06F 11/3672 |
| | | | | 707/759 |
| 2013/0254124 | A1* | 9/2013 | Tan | G06Q 10/00 |
| | | | | 705/310 |
| 2014/0181007 | A1* | 6/2014 | Kolehmainen | G06Q 30/04 |
| | | | | 707/607 |
| 2014/0279807 | A1* | 9/2014 | Dimitrijevic | G06N 5/025 |
| | | | | 706/47 |
| 2014/0351045 | A1* | 11/2014 | Abihssira | H04N 21/25841 |
| | | | | 705/14.53 |
| 2015/0106353 | A1* | 4/2015 | Nguyen | G06F 17/30873 |
| | | | | 707/707 |
| 2016/0132979 | A1* | 5/2016 | Schneller | G06Q 10/0635 |
| | | | | 705/310 |
| 2016/0155179 | A1* | 6/2016 | Wang | G06F 17/3064 |
| | | | | 705/26.61 |
| 2016/0196340 | A1* | 7/2016 | Cheslow | G06F 17/30401 |
| | | | | 707/728 |

OTHER PUBLICATIONS

Schietse et al., "Practive and Challenges in Trademark Image Retrieval", in Proceedings of the 6th ACM International Conference on Image and Video Retrieval, Amsterdam, The Netherland, Jul. 9-11, 2007, pp. 518-524.*

Trademark Search, 7 pages, accessed online at <http://trademarkesearch.com/> on Aug. 25, 2017.*

WIPO article, "WIPO Launches Unique Image-Based Search for Trademarks, Other Brand Information", 2 pages, dated May 12, 2014, accessed online at <http://www.wipo.int/pressroom/en/articles/2014/article_0007.html> on Aug. 25, 2017.*

Ciocca et al., "Similarity Retrieval of Trademark Images", in Proceedings of International Conference on Image Analysis and Processing, 1999, 6 pages. (Year: 1999).*

Lin et al., "Trademark Image Retrieval by Distance-Angle Pair-Wise Histogram", International Journal of Imaging Systems and Technology, vol. 15, Issue 2, Aug. 18, 2005, pp. 103-113. (Year: 2005).*

Qi et al., "An Effective Solution for Trademark Image Retrieval by Combining Shape Description and Feature Matching", Pattern Recognition 43 (2010): pp. 2017-2027 (Year: 2010).*

You et al., "A Rotation Invariant Image Retrieval with Local Features", International Journal of Control, Automation, and System, vol. 1, No. 3, Sep. 2003, pp. 332-338 (Year: 2003).*

* cited by examiner

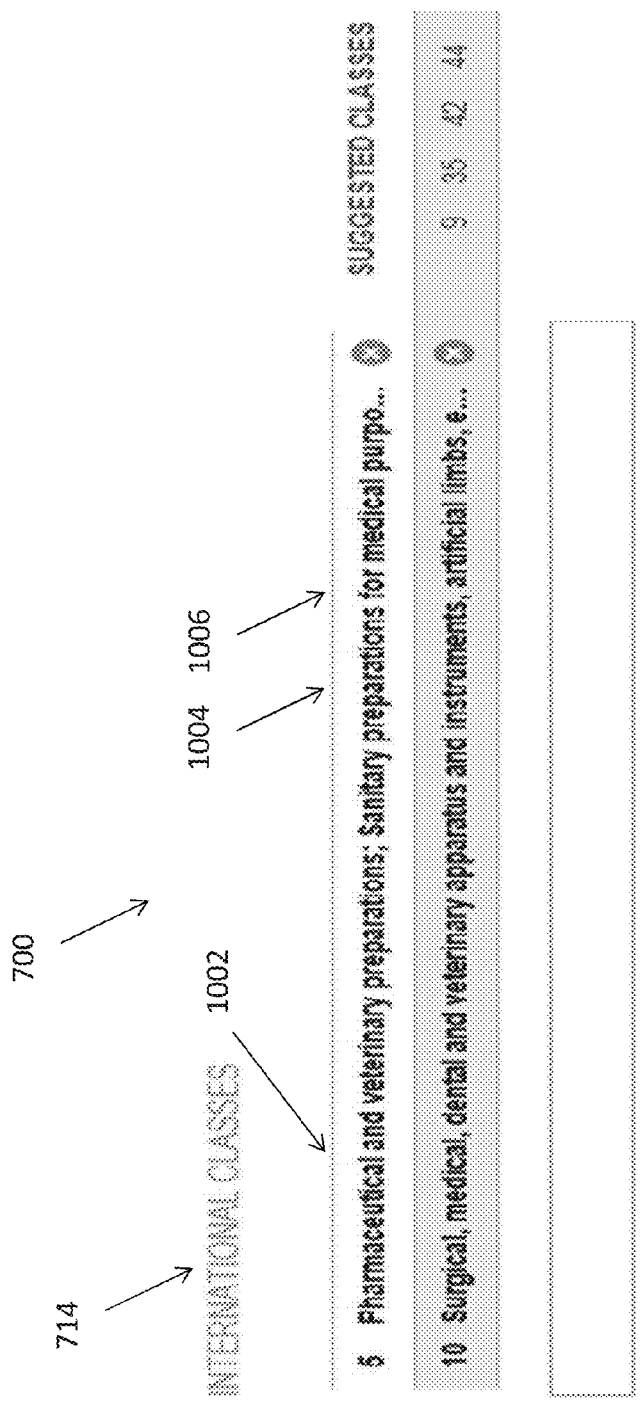
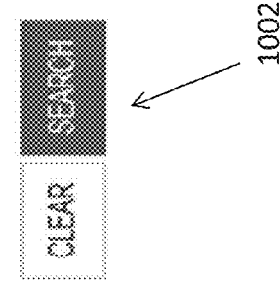
Fig. 10

SYSTEM AND METHODS FOR AUTOMATING TRADEMARK AND SERVICE MARK SEARCHES

RELATED APPLICATIONS

The present application claims priority to U.S. Provisional Patent Application No. 61/990,859, filed on May 9, 2014, and to U.S. Provisional Patent Application No. 61/990,865, filed on May 9, 2014, the entirety of which are incorporated herein by reference.

TECHNICAL FIELD

Exemplary embodiments of the present disclosure relate to improved searching and traversal of repositories as well as improved processing of search results.

BACKGROUND

An overwhelming amount of data has been made available for retrieval over the Internet or over other communication networks. Such data is generally available from a large number of different data sources, including data sources curated by data service providers. Some people seeking to find data using key terms entered into search engines or other processes often cannot efficiently find the data they are looking for. Moreover, once a set of search results is provided, some people may not be able to use the results in a meaningful way. Additionally, some people may not possess the skill or time necessary for developing precise search terms to ensure that results of a search are comprehensive and complete, and also may not possess the skill or time necessary for interpreting large volumes of data returned in response to searches.

The above issues may be particularly true when one is searching for trademarks and/or service marks (e.g., word marks, trademark images/logos) in syntax-driven repositories (e.g., to conduct trademark or service mark clearances), where differences in spelling, context, or presentation of search terms can yield different results that may or may not include pertinent trademarks or service marks that should be reviewed as part of the trademark clearance process. When performing trademark clearances or similar tasks, the person (or people) conducting the clearance is typically interested in receiving search results that are similar to a proposed trademark or service mark, which can include words, sounds, images, and/or colors, and the like, and then determining whether any of the results are "confusingly" similar to proposed mark.

When considering whether any of the results are confusingly similar to the proposed mark, the person conducting the search typically needs to take into account not only the spelling of words, actual images, or colors in the proposed mark, but also, for example, how the words sound when they are spoken, morphological similarity, the meaning/semantics behind the words, possible translations and/or transliterations and/or whether images and/or colors in any of the results are similar enough to the proposed mark (e.g., an image of a horse vs. an image of a donkey). Therefore, when searching for confusingly similar trademarks or service marks, it may be necessary to conduct a broad search. However, this may introduce a large quantity of irrelevant trademarks or services marks in the search results, which can make it difficult and time consuming for someone to review and identify potentially confusingly similar marks.

There remains a need for solutions to effectively and efficiently traverse data repositories to identify, retrieve, and process data that may be of interest to users, while simplifying the input required by the users to initiate such identification, retrieval, and processing.

SUMMARY

Exemplary embodiments of the present disclosure provide systems, methods, and non-transitory computer-readable media to address the disadvantages of conventional search engines and data searching processes to facilitate efficient and effective traversal of source repositories. Based on search terms received from a user, exemplary embodiments of the present disclosure can advantageously transform the search terms into one or more queries, using one or more query languages. The queries can be generated from search strategies and can add to, enhance, and/or improve upon the search terms originally provided by the user to improve the quality and comprehensiveness of the results returned by the repository beyond what would have been normally provided if only the user-provided key terms formed the query. Exemplary embodiments of the present disclosure can advantageously reduce the complexity and burdensome processes often associated with interfacing with syntax-driven repositories or repositories using key terms and syntax specific to the encoding scheme of the repositories or repositories.

Once results from the repositories have been retrieved, exemplary embodiments of the present disclosure can discount or remove some of the results before any of the results are provided to the user. For example, some results can be removed based on a determination that the removed results are not deemed to be confusing similar to the terms in the search order. As such, while the search and retrieval processes of exemplary embodiments can expand the score of a search to be more inclusive, the presentation processes of exemplary embodiments can then narrow or reduce the quantity of results before sending the results to user; thereby reducing the time and effort required by a user to parse through the results, while at the same time providing trademarks and/or service marks (e.g., word marks, trademark images, logos) that may be phonetically, graphical, semantically, translation, morphological, and/or contextually, similar to the user-provided key terms used to initiate the search.

In accordance with embodiments of the present disclosure, a method of extracting confusing similar trademarks from one or more repositories is disclosed. The method includes receiving, by one or more servers, an electronic search order including a text-based input string, a list of jurisdictions, a list of international classes, and/or a list of goods & services text-based input strings, executing conditional logic of one or more rules to process the search order, and transforming the search order into one or more queries based on execution of the conditional logic of one or more rules. The method also includes retrieving a set of trademarks from one or more repositories using the one or more queries to generate search results. The set of trademarks retrieved can be limited to the list of jurisdictions and the list of international classes. The method further includes transmitting, via a communication network, at least a portion of the search results to a user computing device to be rendered in a graphical user interface of a display device associated with the computing device.

In accordance with embodiments, a system of extracting confusingly similar trademarks from one or more repositories is disclosed. The system includes one or more repositories, one or more rule bases, and a distributed server environment. The one or more repositories store trademarks and metadata associated with the trademarks. The one or more rule bases include rules formed by conditional logic. The distributed server environment includes servers operatively coupled to each other via a communication network. The servers configured to interact with the one or more repositories and rules bases and are collectively programmed to receive an electronic search order including a text-based input string, a list of jurisdictions, a list of international classes, and/or a list of goods and services text-based input strings; execute conditional logic of one or more of the rules in the one or more rule bases to process the search order; transform the search order into one or more queries based on execution of the conditional logic; and retrieve a set of trademarks from the one or more repositories using the one or more queries to generate search results. The set of trademarks retrieved is limited to the list of jurisdictions and the list of international classes. The servers are also programmed to transmit at least a portion of the search results to a user computing device to be rendered in a graphical user interface of a display device associated with the computing device.

In accordance with embodiments, a non-transitory computer readable medium is disclosed, which stores instructions that are executable by one or more processing devices. Execution of the instructions by one or more servers causes the one or more servers to receive an electronic search order including a text-based input string, a list of jurisdictions, a list of international classes, and/or a list of goods and services text-based input strings; execute conditional logic of one or more of the rules in the one or more rule bases to process the search order; transform the search order into one or more queries based on execution of the conditional logic; retrieve a set of trademarks from the one or more repositories using the one or more queries to generate search results. The set of trademarks retrieved are limited to the list of jurisdictions, and depending on a specified list of international classes, stricter or broader variations can be applied. Execution of the instructions further causes the one or more servers to transmit at least a portion of the search results to a user computing device to be rendered in a graphical user interface of a display device associated with the computing device.

In accordance with embodiments of the present disclosure, the search order can be transformed into one or more queries by identifying visual, semantic, translation, morphological or phonetic equivalents (or combinations thereof) of the text-based input string in response to execution of the conditional logic, transforming the search order into a search strategy including one or more directives for processing the search order based on execution of the conditional logic and the visual, semantic, translation, morphological or phonetic equivalents, and interpreting the directives of the search strategy to transform the search strategy into the one or more queries.

In accordance with embodiments, it can be determined whether each of the trademarks retrieved from the one or more repositories satisfies a filtering criteria. Trademarks that satisfy the filtering criteria can be transmitted to a user device, while trademarks that do not satisfy the filtering criteria are not transmitted to the user device. To determine whether each of the trademarks retrieved from the one or more repositories satisfies a filtering criteria exemplary embodiments can compare each of the trademarks to the text-based input string of the order, generate a similarity score for each of the trademarks in response to the comparison, and compare each of the similarity scores to a similarity score threshold. The trademarks having a similarity score that exceeds the similarity score threshold can be transmitted to the user device.

In accordance with embodiments of the present disclosure, the text-based input string of the order can describe a word mark or a trademark image/logo. With respect to the latter, embodiments can identify recognized words in the input string and map the recognized words onto a set of concepts used to annotate trademark images in a trademark repository. The order can be transformed into one or more queries based on execution of the conditional logic by executing a rule matcher to identify which of the one or more rules apply to query generation based on one or more concepts extracted from the text based input string, executing the one or more rules identified by the rule matcher to transform the search order into the one or more queries; extracting one or more low level codes associated with trademark images stored in the one or more repositories based on executing the identified rules; and forming the one or more queries based on the low level codes. In the event that it is determined that the set of trademarks returned by the one or more queries is a null set, embodiments of the present disclosure can generalize the one or more rules used to generate the one or more queries and generate one or more new queries based on generalizing the rules. Further generalization can occur when it is determined that a further set of trademarks returned in response to the one or more new queries is a null set. In some embodiments, the one or more rules can be generalized for a specified number of terms in the one or more queries to generate the one or more new queries.

Any combination and permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

Exemplary embodiments of the present disclosure will be understood from the following detailed description when read with the accompanying figures. In the drawings, like reference numerals refer to like parts throughout the various views of the non-limiting and non-exhaustive embodiments of the present invention, and wherein:

FIG. 10 depicts a portion of a GUI showing a data entry field for international class selection.

DETAILED DESCRIPTION

Exemplary embodiments of the present disclosure provide systems, methods, and non-transitory computer-readable media for efficiently and effectively traversing source repositories (e.g., databases). Exemplary embodiments can use one or more processes to transform user-provided search terms into one or more queries in one or more query or programming languages. The transformation of the user-provided search terms to the one or more queries can be based on an application of one or more conditional rules to the search terms, which can change the search terms, can add additional search terms, and/or can associate equivalents and/or very close similar variations (visual, phonetic, contextual, semantic, translation, morphological) to form a search strategy that optimizes, enhances, and/or improves the quality and comprehensiveness of the results returned by the repository. By generating queries in accordance with exemplary embodiments of the present disclosure, exemplary embodiments can control an input to an information retrieval system to provide a comprehensive search of repositories while reducing the complexity and burden experienced by a user when interfacing, for example, with syntax-driven repositories.

In exemplary embodiments, once results from the repositories have been retrieved in response to queries, some of the results returned by the queries can be discounted or removed to control an output of the information retrieval system. For example, exemplary embodiments can assess the results to determine that some of the results will not be relevant to a user, and can remove the results that are determined to be irrelevant to reduce the quantity of results and the time required by a user to parse through the results. The results can also be grouped based on metadata associated with the results and/or based on the results themselves.

In one non-limiting example application, exemplary embodiments of the present disclosure can be configured to facilitate extraction of confusingly similar trademarks or service marks from one or more trademark repositories. The terms trademark and service mark can be used interchangeably herein and refer to word marks, trademark images/logos, trademarked sounds, trademarked colors, and/or any other suitable identifier of the source of goods/services. While the present disclosure describes such a non-limiting example application, exemplary embodiments of the present disclosure can be utilized to search for any data stored in repositories based on the application of visual, semantic, translation, morphological, phonetic, contextual (or any other sutiable methodology that expresses some form of similarity) equivalents and/or similars as described in relation to FIG. 1.

Figure 1:
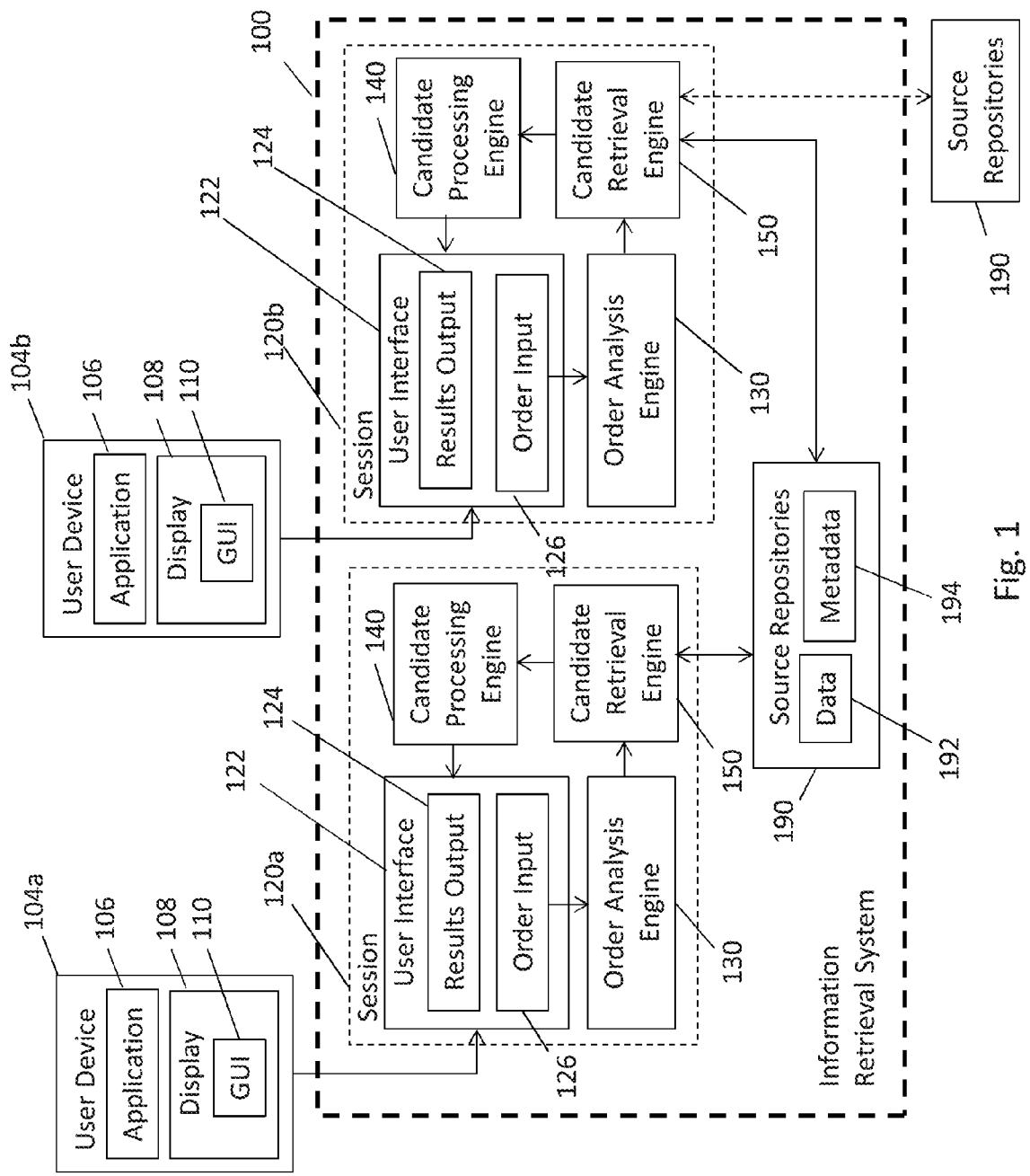
FIG. 1 is a block diagram depicting an information retrieval system in accordance with exemplary embodiments of the present disclosure.

FIG. 1 is a block diagram depicting an information retrieval system 100 for implementing a search engine in accordance with exemplary embodiments of the present disclosure. In exemplary embodiments, the information retrieval system 100 can be implemented by one or more servers and one or more repositories, which can communicate directly with each other and/or may communicate with each other via one or more communication networks as described herein. In some embodiments, user devices 104a-b can interact with the information retrieval system 100 to establish communication sessions 120a-b, respectively, to maintain a state of the communication between the user devices 104a-b and the information retrieval system 100. In some embodiments, the communication between the user devices 104a-b and the information retrieval system 100 can be sessionless or stateless. The user devices 104a-b can be computing devices (including a personal computer, a workstation, a tablet, a smart phone, a laptop, a server, and the like) configured to communicate with the information retrieval system 100 over one or more communication networks using one or more communication protocols.

For embodiments that manage a state of the communication, the sessions 120a-b persist for a period of time (e.g., from the time a user logs into or otherwise accesses the information retrieval system 100 to the time the user logs out of or disconnects from the information retrieval system 100 or until the session times out), can facilitate bidirectional communication between the information retrieval system 100 and the user devices 104a-b, and can maintain a state of the communication between the information retrieval systems 100 and the user devices, respectively. For example, the information retrieval system 100 can save information about the session history and/or can instruct and/or control the user devices 104a-b to save information about the session history (e.g., in the form of tokens and/or cookies) to enable the communication.

The user devices 104a-b can each include an application 106, such as a web browser or a stand-alone application specific to the information retrieval system 100. The application 106 can be downloaded, installed, and executed by the user devices 104a-b (e.g., by a processing device) to interact with the information retrieval system 100 and/or to render one or more graphical user interfaces (GUIs) 108 associated with the information retrieval system 100 on a display device 110 of the user devices 104a-b in response to, for example, data and/or instructions received from the information retrieval system 100. The GUIs 108 displayed to users can include data entry areas to receive information from the user; can include user-selectable elements or areas that can be selected by the user to cause the information retrieval system 100 to perform one or more operations, functions, and/or processes; and/or can include data outputs to display information to users. In exemplary embodiments, the GUIs 108 can enable navigation and/or traversal of the information retrieval system 100. Users can interact with the user devices 104a-b via the GUIs 108 to enter search orders to be submitted to the information retrieval system 100 and to view search results output by the information retrieval system 100.

In exemplary embodiments, the information retrieval system 100 can implement one or more instances of a user interface engine 122 for each user device interaction (e.g., an instance for each of the sessions 120a-b), and the instances of the user interface engine 122 can be programmed to transmit data and/or instructions to the user devices 104a-b, which can be used by the user devices 104a-b to render content of the GUIs 108 on the display devices 110. The users' devices 104a-b can interact with the information retrieval system 100 using the GUIs 108 to perform one or more activities in information retrieval system 100. As one example, the users can construct, via the GUIs 108, search orders including text-based strings forming one or more search terms, and may submit the search orders to the information retrieval system 100 (e.g., as order inputs 126 received via the user interface engine 122). The system 100 can perform one or more processes in response to the search request. For example, the system 100 can perform order analysis processes, which can be implemented by instances of an order analysis engine 130; candidate retrieval processes, which can be implemented by instances of a candidate retrieval engine 140; and/or candidate presentation processes, which can be implemented by instances of a candidate presentation engine 150, in accordance with embodiments of the present disclosure.

In exemplary embodiments, the instances of the order analysis engine 130 can receive search orders including search terms from the user devices 104a-b (e.g., entered by users via the GUIs 108), and can programmatically examine the orders and define the manner with which the orders will be processed by the information retrieval system 100. As one example, the order analysis engine 130 can generate a search strategy, based on the search terms of an order, that includes directives that define how the order is processed by the candidate retrieval engine 140 and the candidate presentation engine 150. The search strategy can include the information necessary to effectively carry out the candidate retrieval and presentation processes as described herein. As part of the search strategy generation, the order analysis engine 130 can apply order rules and natural language resources to annotate or otherwise modify the order to include the directives. As another example, the order analysis engine 130 can identify semantic equivalents of search terms in an order and can identify recognized concepts based on the search terms and semantic equivalents, which can be used to identify rules to be used during candidate retrieval and/or presentation processes of the information retrieval system 100.

The candidate retrieval engine 140 can generate one or more queries in one or more query languages based on, for example, a search strategy or rules identified by the order analysis engine 130. Using the generated queries, the candidate retrieval engine 140 can retrieve data 192 and metadata 194 from one or more source repositories (or databases) 190. The generation of the one or more queries transform the original search order into a robust set of precise queries that are generally defined to provide a comprehensive and robust set of search results according to the syntax or encoding associated with the source repositories 190.

In exemplary embodiments, the one or more source repositories 190 that can be searched by the candidate retrieval engine 140 can include the data 192 and metadata 194 associated with the data 192. In exemplary embodiments, the data 192 can include any suitable content or data that may be stored in a repository and retrieved in response to one or more queries (e.g., including documents, text, images, video audio), and the metadata 194 can generally be any metadata related to the source data 192. In some embodiments, one or more of the source repositories 190 can be included in the system 100 and/or one or more source repositories can be external to, and separate from, the system 100. In some embodiments, the source repositories 190 can include proprietary repositories including enriched metadata that can be generated automatically or manually to improve the search capabilities of the source repositories 190.

The candidate presentation engine 150 can receive the search results returned by the candidate retrieval engine 140, and can process the search results to prepare the data and metadata included in the search results for transmission to the requesting user device (e.g., user device 104a or 104b) via the results output 124 of the user interface engine 122. In exemplary embodiments, the candidate presentation engine 150 can perform one or more functions including scoring the search results, grouping the search results based on the metadata or the data itself, filtering the search results to create a subset of results to be transmitted to the user device, and preparing presentation instructions to be transmitted with the search results to instruct the user device how to display the search results in the GUIs 108 rendered by the display devices 106.

Figure 2:
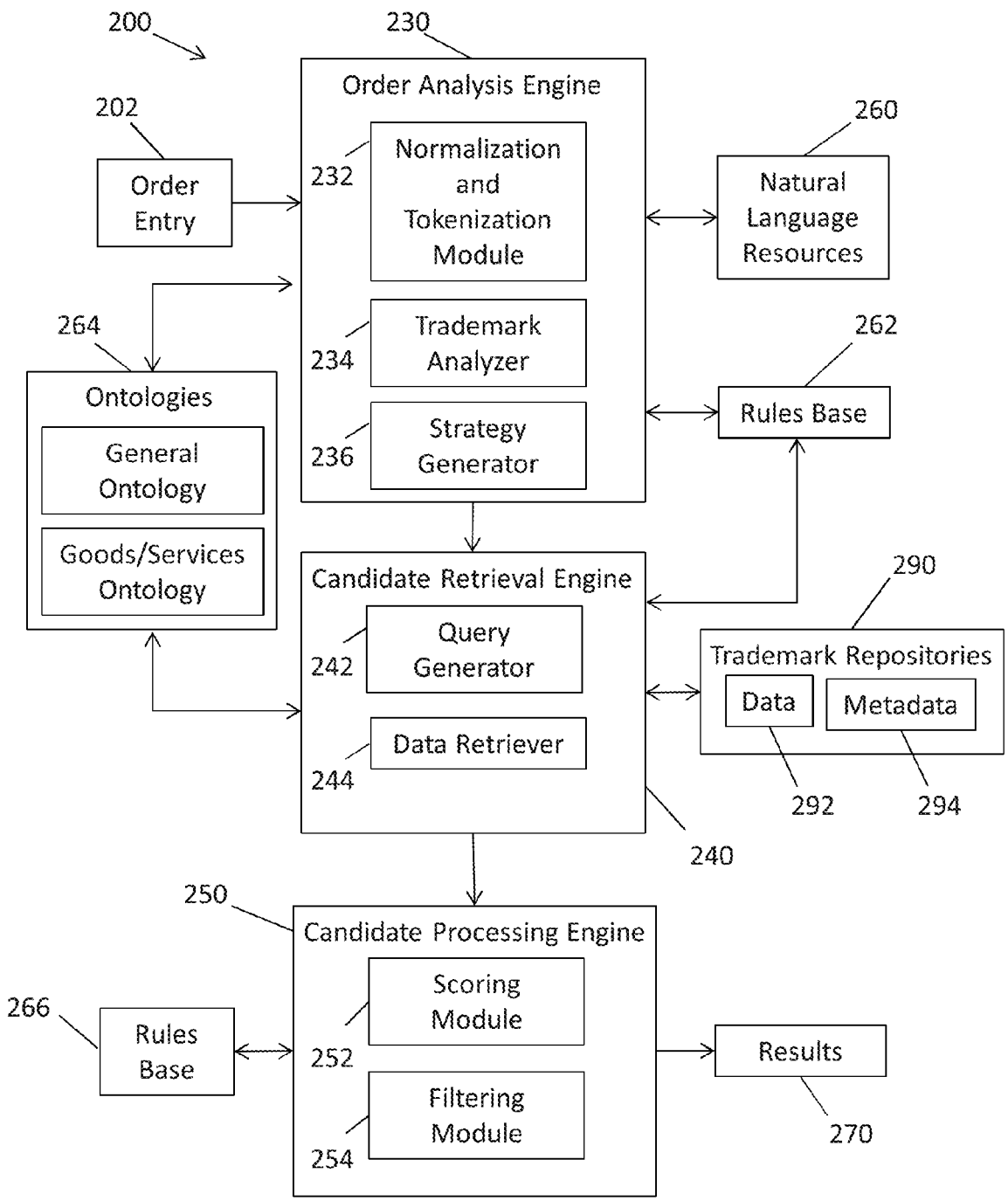
FIG. 2 is a block diagram of an exemplary embodiment of an information retrieval system that identifies confusingly similar word-based trademarks or service marks (e.g., word marks) based on a user supplied search order or request.

FIG. 2 is a block diagram of an exemplary embodiment of an information retrieval system 200 that implements a search engine for identifying confusingly similar word-based trademarks or service marks (e.g., word marks) based on a user supplied search order. The system 200 can include an order analysis engine 230, a candidate retrieval engine 240, and a candidate presentation engine 250. A user of the system 200 can submit, via one or more graphical user interfaces, an order 202. In response to the order 202, the system 200 can output a set of results that have been specifically generated to provide the user with a set of registered trademarks that may be confusingly similar to the order 202 (e.g., based on an operation of the engines 230, 240, and 250). For these trademarks, the results can include metadata associated with relevant information about the trademarks to identify, for example, the trademark office that published trademark document, the registration number, the date of registration, the owner of the trademark, the next renewal date or window, and/or any other suitable information about the trademark.

As described herein, the order 202 can include an input string (e.g., of textual elements) forming one or more words for the trademarks that the user wishes to search. The order 202 can also include international classes to be searched (e.g., as defined in the World Intellectual Property Organization (WIPO) classification) and lists of jurisdictions to be searched, as well as a list of input strings forming one or more words that indicate for which goods and services the searched trademark(s) will be or are associated with. Those skilled in the art will recognize that any suitable input string can be submitted by a user in any language using any recognized glyphs including Latin and non-Latin characters. The following input strings are provided as non-limiting examples to aid in describing an operation of various components of the system.

BOLUGREDO
MATCH
YELLOW LION
TRESATRE Cleaning Services

The order analysis engine 230 can include a normalization and tokenization module 232, a trademark analyzer 234, and a strategy generator 236. The order analysis engine 230 can receive the search order 202 transmitted to the system 200 by a user device (e.g., in response to submission of the order 202 by the user via one or more GUIs). In exemplary embodiments, the order analysis engine 230 can programmatically examine the order 202 and define the manner with which the order 202 will be processed by the information retrieval system 100. For example, the order analysis engine 230 can generate a search strategy, based on the search terms formed by the text-based input strings, specified international trademark classes in the search order, the goods/services specified in the search order, and/or other portions of the search order. The search strategy can define one or more directives which control how the order is processed by the candidate retrieval engine 240 and the candidate presentation engine 250. The search strategy can include the information necessary to effectively carry out the candidate retrieval and presentation processes as described herein.

The normalization and tokenization module 232 can receive the text-based input string of the order as an input and can output a set of strings that contains only characters that can be processed by the system 200 by applying order rules of a rules base 262 and natural language resources 260. The rules base 262 and natural language resources 260 can be created to mimic or simulate human thought process to aid in formulation of a search strategy. The normalization and tokenization module 232 can clean-up and validate the input string (i.e. the search terms), can split the input string into different elements (tokenization), and can normalize (e.g., by converting diacritics characters into non-diacritics characters, if needed, e.g. β to s or ss, or performing of character or string manipulations) the input string or elements to identify common or standardized spellings and/or usage associated with the terms. The normalization and tokenization module 232 can generate phonetic equivalents for the tokenized and normalized input strings in the submitted human language and/or in different human languages.

When the input string includes compound strings, the normalization and tokenization module 232 can split or parse the compound strings into parts (e.g., separate words and/or semantic units). For example, the normalization and tokenization module 232 can use natural language resources 260 to determine whether the input string is actually a compound of multiple words that are concatenated. When the normalization and tokenization module 232 determines that the input string resembles natural language, the normalization and tokenization module 232 can determine a function of the words in the input string (e.g., parts of speech, such as adjective, verb, or noun). Similarly, when the normalization and tokenization module 232 determines that the input string resembles natural language, the normalization and tokenization module 232 identifies various possibilities for stemming and inflections of the words in the input string for inclusion in the search strategy.

The trademark analyzer 234 can receive the text-based input string and can output a set of strings including annotations using the rules of the rules base 262 to determine, for example, a relative importance of the different words in the text-based input string as they relate to words that may form a dominant portion of a trademark, which can aid in defining a degree of variation the information retrieval system 200 is permitted to apply to each of the words included in the input string during the candidate retrieval processes. Similarly, when the input string includes multiple words, the trademark analyzer 234 can determine which combinations of words in the input string are important/valuable as they relate to words that may form a dominant portion of a trademark. In exemplary embodiments, the trademark analyzer 234 can process the words included in the input string against a repository of words to identify semantically equivalent words in one or more languages, and can add the semantically equivalent words to the search strategy. The trademark analyzer 234 can annotate one or more terms in the set of ouput strings with several characteristics that can be either absolute or relative, like familiarity (how familiar would a certain word be to an average human user), term type (existing word, fantasy term, long or short word, abbreviation, and the like) and relative importance of that word within the trademark (e.g., only word, most important word, one of multiple equally important words, and the like).

Based on the output of the normalization and tokenization module 232 and the trademark analyzer 234, the strategy generator 236 can generate or build a search strategy that includes one or more directives that can be used by the candidate retrieval engine 240 to generate one or more queries. Also, based on the output of the normalization and tokenization module 232 and the trademark analyzer 234, the strategy generator 236 can determine whether the text-based input string as a whole should be processed as a one word mark, a two word mark, a slogan, some other type of mark, and/or any combination thereof (e.g., a single order can be processed to include one or more of the aforementioned).

As one example, the strategy generator 236 can determine which phonetic equivalents identified by the normalization and tokenization module 232 to include in the search, whether the compounded words identified by the normalization and tokenization module 232 should be processed together as a single word and/or separately as individual words, and/or can determine which of the various possibilities for stemming and inflections of the words in the input string should be included in the search strategy. As another example, the strategy generator 236 can define a degree of variation in the search strategy to apply to each of the words included in the input string, can add word combinations identified by the trademark analyzer 234, and/or can determine which semantically equivalent words identified by the trademark analyzer 234 to include in the search strategy. The directives of the search strategy can be selected from a set of directives based on the analysis of the output from the normalization and tokenization module 232 and the trademark analyzer 234.

In exemplary embodiments, the order analysis engine 230, e.g., via the normalization and tokenization module 232 and strategy generator 236 can also process the one or more strings associated with the goods/services specified in the search order. For example, the order analysis engine 230 can interface with one or more ontologies 264, such as a general term/word ontology, a goods/services ontology, and the like. The ontologies 264 can be utilized by the engine 230 to identify semantically related words. For example, the goods/services ontology can be utilized by the order analysis engine 230 to identify goods/services that are semantically related to the goods/services specified in the search order 202. The goods/services ontology can include a repository of terms (e.g., such as common terms for goods and services) and can be structured such that semantically related terms are linked or otherwise associated with each other. When a term in the goods/service specified in the search order is compared against the terms in the goods/services ontology, the goods/services ontology can map the term to its semantically related terms, and the order analysis engine 230 can use the semantically related terms to generate the search strategy.

Some search strategies that can be generated or built by the strategy generator 236 are described using the above example input strings "BOLUGREDO," "MATCH," "YELLOW LION," and "TRESATRE Cleaning Services."

With respect to the input string "BOLUGREDO," the output of the strategy generator 236 of the order analysis engine 230 is a search strategy containing directives that include all info needed to effectively carry out the retrieval and presentation processes described herein. As an example, the search strategy can be represented as follows:

Strategy→-BOLUGREDO {coined, length_long, no split, . . . }

As shown above, the input string has been modified to include directives. The directives are recognized by the system 100 and define how the system should process the search strategy. In the present example, the dash "-" before the input string can be a directive that indicates that the information retrieval system should obtain the broadest variation when processed by the candidate retrieval engine 240 and the candidate presentation engine 250. For example, the candidate retrieval engine 240 should include as many variation of the input string as possible (e.g., phonetic and semantic variations) when creating or building the queries and the candidate presentation engine should include a wide variation of trademarks in the results that are semantically and/or phonetically similar to the input string. The additional directives between the brackets "{" and "}" are used by the candidate retrieval engine 240 and the candidate presentation engine 250 when executing the rules base. For example, the additional term "coined" can instruct the candidate retrieval engine 240 to use the broadest variations available and trigger specific models suited for fantasy terms and can instruct the candidate presentation engine 250 to, e.g., create a representation of all matching terms combined with their frequency to give the user a quick (interactive) overview of what to expect in the final list, as well as the ability to reject certain (types of) matches; the additional term "length_long" can instruct the candidate retrieval engine 240 to trigger specific rules and associated retrieval models that would not make sense for short(er) words and can instruct the candidate presentation engine 250 to show a specific (interactive) representation indicating which parts of the word are found to be more or less distinctive in trademark space; and the additional term "no split" can instruct the candidate retrieval engine 240 to ignore rules and associated retrieval models that work specifically on terms that could also be split up into several individual terms and can instruct the candidate presentation engine 250 to ignore showing specific representations that indicate what exists in trademark space for specific split options of the original term or interactively allow the user decide on one or more splits anyway and feed that info back into the system 200.

With respect to the input string "MATCH," the search strategy generated by the strategy generator 236 can be represented as follows:

Strategy→-MATCH {dictionary (English), length_medium, no split, noun, . . . }

The dash "-" before the input string can be a directive that indicates that the information retrieval system should obtain the broadest variation when processed by the candidate retrieval engine 240 and the candidate presentation engine 250, while taking into account the additional directives between the brackets "{" and "}". For example, the candidate retrieval engine 240 should include as many variation of the input string as possible (e.g., phonetic and semantic variations) when creating or building the queries, and the candidate presentation engine 250 should include a wide variation of trademarks in the results that are semantically and/or phonetically similar to the input string.

The additional directives between the brackets "{" and "}" are used by the candidate retrieval engine 240 and the candidate presentation engine 250 when executing the rules base. For example, the additional term "dictionary (English)" can instruct the candidate retrieval engine 240 to trigger specific rules and associated retrieval models that work on natural language words (e.g., inflections, translations, etc.), while ignoring models that, e.g., turn an existing word into a similar looking or sounding but semantically different word and can instruct the candidate presentation engine 250 to indicate to the user specific decisions were made (such as ignoring the semantically different but otherwise similar words so the user can reverse that decision if he or she deems them relevant despite the decision made by the system 200) the additional term "length_medium" can instruct the candidate retrieval engine 240 to ignore rules and associated retrieval models that are specifically designed for very short or very long words or trigger these with different constraints (such as allowing more or less variation than the model usually allows depending on whether the word is longer or shorter respectively) and can instruct the candidate presentation engine 250 to indicate which specific decisions were taken as compared to the treatment of either a longer or shorter word; the additional term "no split" can instruct the candidate retrieval engine 240 to ignore rules and associated retrieval models that work specifically on terms that could also be split up into several individual terms and can instruct the candidate presentation engine 250 to ignore showing specific representations that indicate what exists in trademark space for specific split options of the original term or interactively let the user decide on one or more splits anyway (if the machine got it wrong) and feed that info back into the retrieval engine; and the additional term "noun" can instruct the candidate retrieval engine 240 to, e.g., understand semantic equivalents should also be nouns so other part of speech words can be ignored as alternatives and can instruct the candidate presentation engine 250 to indicate to the user why specific semantic alternatives were picked, or allow the user to indicate other part of speech options he or she deems valid as well (or instead) and feed that info back into the retrieval engine.

With respect to the input string "YELLOW LION," the search strategy generated by the strategy generator 236 can be represented as follows:

```
Strategy → (/YELLOW/LION)
  /YELLOW{dictionary(English),<COLOR>, length_normal,
  adjective, . . . }
    /LION{dictionary(English), <ANIMAL>, length_short, noun,. . .}
```

As shown above, the system 200 has transformed the input strings into combined and separate terms, where of the terms generated by the system 200 has been annotated with directives. The forward slashes "/" can be a directive that indicates that the individual words should contain reduced variation (e.g., because the word that is preceded by a slash is considered as not being dominant in the trademark, or not being a very strong word). The parentheses "(" and ")" can be directives that indicate that the search should also include the conjoined word YELLOWLION and variations thereof (e.g., semantic, phonetic, or otherwise). The additional directives between the brackets "{" and "}" for each word/element are used by the candidate retrieval engine 240 and the candidate presentation engine 250 when executing the rules base.

For example, the additional term "dictionary(English)" can instruct the candidate retrieval engine 240 to trigger specific models that deal with language dependent alternatives (semantic alternatives—preferably in English, translations where the word should be interpreted as being in English, inflections—preferably in English, and the like) and can instruct the candidate presentation engine 250 to indicate English specific and natural language specific logic was used for each of the words YELLOW and LION; the additional term "<COLOR>" can instruct the candidate retrieval engine 240 to trigger specific semantic resources that provide alternative colors or words related to the concept of color and can instruct the candidate presentation engine 250 to indicate the reason why specific alternatives for a given word were preferred over others; the additional term "length_normal" can instruct the candidate retrieval engine 240 to avoid triggering rules and associated retrieval models tuned specifically for (very) short or (very) long words not appropriate here, or call these models but with constraints different than the ones they usually apply and can instruct the candidate presentation engine 250 to indicate the reason(s) why certain models were not triggered (so the user knows what not to look for since it will not be there anyway, like e.g. typical variations the machine only considers for very long words); the additional term "adjective" can instruct the candidate retrieval engine 240 to, e.g., guide semantic alternative logic to prefer semantic alternatives that also have "adjective" as their typical part of speech over other semantic alternatives and can instruct the candidate presentation engine 250 to let the user know that behavior was picked by the engine, giving the user the ability to correct this if he/she finds that result invalid or valid yet undesirable and feed that information back into the retrieval engine; the additional term "<ANIMAL>" can instruct the candidate retrieval engine 240 to trigger very specific semantic resources that propose other animals as retrieval terms, despite these terms being neither phonetically nor visually similar to the original term and can instruct the candidate presentation engine 250 to indicate to the user why these other animals were seen as alternatives for this word, despite their phonetic/visual difference; the additional term "length_short" can instruct the candidate retrieval engine 240 to trigger specific logic only suited for short(er) words, and ignore logic that only produces valid results for longer words, or trigger that logic with other constraints better suited for shorter words and can instruct the candidate presentation engine 250 to indicate to the user why certain logic was executed and other logic was not; and the additional term "noun" can instruct the candidate retrieval engine 240 to e.g. understand semantic equivalents should also be nouns so other part of speech words can be ignored as alternatives and can instruct the candidate presentation engine 250 to indicate to the user why specific semantic alternatives were picked, or allow the user to indicate other part of speech options he or she deems valid as well (or instead) and feed that info back into the retrieval engine.

With respect to the input string "TRESATRE Cleaning Services," the search strategy generated by the strategy generator 236 can be represented as follows:

```
Strategy → -TRESATRE/CLEANING/SERVICES
  -TRESATRE {dominant, coined, length_long, no split, . . . }
  /CLEANING {submissive, dictionary (English), length_medium,
  goods_related, stem(CLEAN), . . . }
  /SERVICES {submissive, dictionary (English), length_medium,
  goods_related, stem(SERVICE), . . . }
```

In the present example, the dash "-" before the element TRESATRE can be a directive that indicates that this is the most important element of the search order (since the other words CLEANING and SERVICES are preceded by a directive in the form of a forward slash "/"). The elements CLEANING and SERVICES are processed by the system 200 taking into account their additional directives included in the brackets "{" and "}".

As one example, the additional term "dominant" can instruct the candidate retrieval engine 240 to explore more variations for this term than for the other terms of the trademark and can instruct the candidate presentation engine 250 to indicate to the user this term was seen as the most important (and most to be varied on) term in the trademark, allowing the user to change this behavior by giving feedback on this dominance (indicating this word is not dominant and potentially indicating other trademark words that are instead, or in addition to it); the additional term "coined" can instruct the candidate retrieval engine 240 to use the broadest variations available and trigger specific models suited for fantasy terms and can instruct the candidate presentation engine 250 to, e.g., create a representation of all matching terms combined with their frequency (and/or other relevant information) to give the user a quick (interactive) overview of what to expect in the final list, as well as the ability to reject certain (types of) matches; the additional term "length_long" can instruct the candidate retrieval engine 240 to trigger specific rules and associated retrieval models that would not make sense for short(er) words and can instruct the candidate presentation engine 250 to show a specific (interactive) representation indicating which parts of the word are found to be more or less distinctive in trademark space; and the additional term "no split" can instruct the candidate retrieval engine 240 to ignore rules and associated retrieval models that work specifically on terms that could also be split up into several individual terms and can instruct the candidate presentation engine 250 to ignore showing specific representations that indicate what exists in trademark space for specific split options of the original term or interactively allow the user decide on one or more splits anyway and feed that info back into the system 200. As another example, the additional term "submissive" can instruct the candidate retrieval engine 240 to treat this word as less important than certain other words in the trademark, hence varying less broadly on it and can instruct the candidate presentation engine 250 to indicate why this word was treated much stricter than certain other words, also giving the user the ability to override the machine's decision on this and feed that knowledge back in to the retrieval engine to change the behavior for this trademark; the additional term "dictionary(English)" can instruct the candidate retrieval engine 240 and the candidate presentation engine 250 to perform one or more actions described herein; the additional term "length_medium" can instruct the candidate retrieval engine 240 and the candidate presentation engine 250 to perform one or more actions described herein; the additional term "goods_related" can instruct the candidate retrieval engine 240 and the candidate presentation engine 250 to perform one or more actions as described herein; and the additional terms "stem(CLEAN)" and "stem(SERVICE)" can instruct the candidate retrieval engine 240 and the candidate presentation engine 250 to perform one or more actions as described herein for each of the word CLEANING and SERVICES.

The strategy generator 236 of the order analysis engine 230 creates the search strategy by combining the information from a number of resources: (1) a trademark word frequency engine of the trademark analyser 234; (2) a trademark indexing frequency engine of the trademark analyzer 234; (3) a natural language frequency engine of the normalization and tokenization module 232 in conjunction with the natural language resources 260; (4) a general ontology (e.g., ontologies 264); (5) an NLP suite (NLP=Natural Language Processing) (e.g., the natural language resources 260); and (6) several custom and/or proprietary resources including a goods ontology and lists of terms related to certain concepts (e.g., ontologies 264). The trademark word frequency engine can provide information related to how often words and parts of words (and word- and letter-based ngrams) occur in trademark space (or a specified subspace of it), where trademark space is generally the set of all trademarks worldwide (or with specified jurisdictions). The natural language engine provide information related to how often words or parts of words (and word- and letter-based ngrams) occur in any natural (human) language and also can provide information to identify natural language terms (versus fantasy terms that appear more frequently in trademark space than in everyday natural language use). The trademark indexing frequency engine inspects how often certain absolute and relative strength decisions (taking context into account) were made (in the trademark annotation process for a given trademark repository) for all words and word-based ngrams in the trademark space. The strength decisions can express how strong and important a word is within a trademark in a trademark database. The ontology can aid in ascertaining the nature of a word, like e.g. a geographical term, a name, a color, etc. The NLP suite can facilitate splitting, stemming, pos-tagging, and other NLP tasks to be performed on words or ngrams of words. The custom and/or proprietary resources can facilitate tagging of words or ngrams of words with specific additional tags like being related to the user specified goods & services terms, being an indication of a company legal form, etc.

The resources are then integrated into a statistical approach (e.g., based on a comparison of a statistical score to a threshold score) to determine the likelihood of which absolute and relative strength(s) each word in an order should have, whether words of an order can also be seen as a combination of other words, which words of an order are of special types (like names, geographical terms, etc.), whether words of an order are typically familiar to people in a certain language or not, etc., as illustrated by the strategy examples above. All valid interpretations (i.e., those interpretations that are above certain thresholds and hence are likely to be correct) are incorporated into the search strategy, so the strategy potentially is a set of individual sub strategies, each of those resembling what needs to be done in a separate sub search—all depending on different ways of how the user input can be interpreted. As a basic example, a search where the input is MYADIDASLTD can be interpreted as (1) a single and very rare fantasy term; as well as (2) a three word search MY ADIDAS LTD where MY is a very common term and possessive pronoun, ADIDAS is a fantasy term that is fairly common in trademark space and dominates MY and LTD in this context and LTD being a company legal form; (3) a one word search ADIDAS where there can be a very broad variation on just that word; and finally (4) a two word search MY ADIDAS where LTD is omitted as it indicates the legal form of the company only. Patterns derived from both past searches conducted as well as user input then determine the relative order of these alternative sub strategies to enable the candidate presentation engine to show a ranked result of all trademarks where the trademarks that are more important for the user are presented higher up in the ranking.

The candidate retrieval engine 240 can include a query generator 242, which can be configured to transform the search strategy generated or built by the order analysis engine 130 into one or more queries (e.g., database or web-based queries). In some embodiments, the query generator 242 can transform the search strategy into one or more queries in one or more query languages based on the directives included in the search strategy. Some examples of query languages includes Structured Query Language (SQL), Contextual Query Language (CQL), proprietary query languages, domain specific query languages and/or any other suitable query languages. In some embodiments, the query generator 242 can also transform the search strategy into one or more queries in one or more programming languages or scripts, such as Java, C, C++, Perl, Ruby, and the like. For example, the query generator 242 can be a code generator that processes the search strategy and generates code based on the terms and directives in the search strategy. In addition, the query generator can consult precomputed query templates that indicate which queries should be fired for a given search strategy, or specific parts of it. These templates are based on domain specific language mined from trademark specialist (and/or professional) behavior, opinions & strategies.

In some embodiments, the one or more queries can include or otherwise be formed using specified classes or goods/service included in the search order (as well as their semantic equivalents). For example, the one or more queries can be limited to trademarks from a particular class that includes goods/services specified in the search order or that are semantically related to the goods/service specified in the search (as determined by the goods/service ontology).

Using the one or more queries, a data retriever 244 of the candidate retrieval engine 240 can identify and retrieve trademarks that are candidates for reporting to the user. The candidate retrieval engine 240 can execute one or more translation functions to implement the search strategies in one or more human languages (e.g., CHEVAL BLANC for a search order WHITE HORSE), which may use Latin characters and/or non-Latin characters. The candidate retrieval engine 240 can implement transliterations to transform words in Latin characters to words in non-Latin characters or vice versa. The output of the candidate retrieval engine 240 includes a set of trademarks returned in response to the one or more queries.

In exemplary embodiments, for each of the textual elements in a search strategy (as determined by the order analysis engine 230), the candidate retrieval engine 240 scans a rule set to determine which types of trademarks need to be retrieved. The rule set includes conditional logic designed to mimic or simulate human thought processes for a particular search strategy. As one example, textual elements having a search strategy that includes the directives "coined," "standalone," or "dominant" can trigger the biggest set retrieval criteria included in the one or more queries to provide for the broadest search of the repository. The rules can include retrieval models that can be executed by the candidate retrieval engine 240 on both a visual representation of the trademark repository content and on a series of phonetic representations of the trademark repository content. The retrieval models are used to retrieve trademarks from the repository based on the search strategy and can be logical combinations of similarity primitives (e.g., functions and algorithms used to determine similarities between to two strings or sets of data).

Some examples of these models, which may used in combination (e.g., connected with logical primitives, such as AND, OR, NOT) or alone, include, but are not limited to: common prefix models (various lengths) that can retrieve trademarks having prefixes in common with one or more of the terms in the search strategy; common suffix models (various lengths) that can retrieve trademarks having suffixes in common with one or more of the terms in the search strategy; common infix models (various lengths) that can retrieve trademarks having infixes in common with one or more of the terms in the search strategy; similar consonant pattern models that can retrieve trademarks having consonant patterns in common with one or more of the terms in the search strategy; similar vowel pattern models that can retrieve trademarks having vowel patterns in common with one or more of the terms in the search strategy; various models using string edit distance measures; common letter set models that can retrieve trademarks having common letter sets with one or more of the terms in the search strategy; number-of-letters-in-common-in-order that can retrieve trademarks having a specified number of letters in common and in order with one or more of the terms in the search strategy; word length that can retrieve trademarks having a similar number of characters as one or more of the terms in the search strategy, is-fantasy-term that can retrieve trademarks formed by made-up words that are similar to one or more of the terms in the search strategy and/or any other suitable retrieval models.

The retrieval models can be expressed as a number of primitives operations on indexes. These indexes can be specifically designed in order to support extreme high performance retrieval of variations important for retrieving confusingly similar trademarks. This includes pattern based retrieval indexes, word count indexes, word combination indexes, frequency indexes, anagram indexes, and/or any other suitable indexes. The indexes can be built upon delivery of new registered trademarks by various trademark offices. The candidate retrieval engine 240 contains functionality to manage these indexes in memory in order to support the performance requirements for the search engine implemented by the system 200. Multiple versions of the indexes are kept in order to support searching on different time points and to switch to newer data without interrupting ongoing searches.

The candidate retrieval engine 240 can retrieve the trademarks from the trademark repositories (or databases) 290, which can include data 292 in the form of trademarks and metadata 294 associated with the trademarks. In exemplary embodiments, the trademark repositories 290 can include registered trademarks for one or more jurisdictions and one or more internal classes of goods (e.g., based on the search order). The candidate retrieval engine 240 can limit the search of the trademark repositories 290 to the jurisdictions and international classes specified in a search order, and/or can limit or control the execution of the rules and retrieval models such that certain rules are executed for certain trademark repositories. For example, certain rules and retrieval models can be associated with certain trademark repositories such that they cannot be properly executed for other trademark repositories.

In some embodiments, the candidate retrieval engine 240 can limit or otherwise control the retrieval of trademarks from one or more of the trademark repositories based on the goods/services specified. For example, certain rules and retrieval models can be associated with goods/services and can be used by the candidate retrieval engine 240 to identify trademarks within the repositories that correspond to the goods/services specified in the search order. In some embodiments, the candidate retrieval engine 240 can be programmed to execute the rules and retrieval logic with logical connectors (e.g., AND, OR) between the query terms associated with the text-based input string associated with trademark terms and the text-based input string associated with goods/services. Using this approach the candidate retrieval engine 240 can be programmed to, for example, retrieve only those trademarks corresponding the trademark terms which also have goods/services corresponding to the goods/services specified in the search order.

The candidate presentation engine 250 can include a scoring module 252 and a filtering module 254, and can filter out false positives or irrelevant trademarks provided in the set of trademarks output by the candidate retrieval engine 240. The candidate presentation engine 250 is programmed to execute comparisons between the order and each trademark returned by the candidate retrieval engine 240 based on a comprehensive rule base 266 including a set of rules to identify the trademarks that the candidate presentation engine 250 considers confusingly similar to the order. The trademarks and/or the terms of the order can be translated and/or transliterated prior to comparison.

In some embodiments, the rules of the rules base 266 can include conditional logic designed to mimic or simulate the human thought process of a subject matter expert. In some embodiment, the rule base 266 is a result of a logic refinement cycle in close cooperation with subject matter experts in order to obtain an as optimal as possible precision/recall value. To obtain this, the conditional logic of the rules combines similarity measures (prefix, suffix, string edit distance, and the like) on visual, phonetic, semantic, translation, morphological and transliterated representations of the trademarks returned by the candidate retrieval engine 240 with the meta information from the search strategy generated by the order analysis engine 230 and enriched trademark content in the trademark repositories 290. The similarity measures can be used to determine and quantify similarities between the retrieved trademarks and the terms identified in the search order. The rules base 266 can include, for example, rules for single word cases, for multiword cases, for semantic cases, for phonetic cases, and/or for any other suitable cases that can be used to identify confusingly similar trademarks. In exemplary embodiments, the rules of the rules base 266 can be written in a domain specific programming language and can be cross-compiled to executable code to achieve high performance. For example, the domain specific programming language can be translated to a common programming language, such as C, C++, Java, and the like, at build-time or run-time.

The scoring module 252 can generate a similarity score for each of the trademarks returned by the candidate retrieval engine 240 based on comparisons between the trademarks and the order (e.g., using the similarity measures). The similarity score can be a string that reflects which retrieval logic triggered a valid similarity to the text-based input string received in the searchorder. Execution of the rules of the rules base 266 can be implemented on a distributed computing platform to execute the comparisons in parallel to achieve a several performance benefits including faster execution of comparison and efficient use of computing resources. In exemplary embodiments, the candidate presentation engine 250 can be executed to process the rules as a forward chaining, backtracking inference engine. Using forward chaining, the conditional logic of the rules are executed sequentially, where the input to one of the rules is derived from an output of previously executed rule. Using backtracking, when execution of the rules fails to yield positive outcomes corresponding to a match between a trademark in the results set and the order, the candidate retrieval engine 250 apply more generalized rules that are higher in the rules hierarchy.

To single out relevant trademarks in densely populated trademark areas, exemplary embodiments of the candidate presentation engine 250 exploit additional trademark specific knowledge. As one example, goods or services similarity measures can be integrated in the rules logic for certain jurisdictions to take this dimension into account when generating similarity scores for trademarks. For example, a registered trademark often include a list of goods or services that are intended to be covered by the trademark. When the order includes a list of proposed goods or services, the scoring module 252 can apply the goods or services similarity measures to the returned trademarks to determine how closely the goods or service of the returned trademarks correspond to the goods or services identified in the order. To achieve this, the conditional logic of the rules can combine string similarity, meta information about the different textual elements and similarities between the goods entered by the client with their order and the published goods and services text associated with the returned trademarks, which can be in one or more languages. As another example, semantic similarity measures can be integrated into the conditional logic of the rules such that, when the scoring module 252 executes the conditional logic, the scoring module 252 considers certain concepts (e.g., <ANIMAL> or <COLOR>). For example, using tuned multilingual ontologies allow for retrieving and selecting, for example, all <COLOR><ANIMAL> trademarks or a subset of all <COLOR><ANIMAL> trademarks (e.g., YELLOW FELI-DAE). The ontologies can be structured to identify relationships between words or concepts.

Upon completion of the comparisons, the candidate filtering module 254 can determine which of the trademarks it considers to be confusingly similar to the order. For example, the candidate filtering module 254 can determine whether the trademarks satisfy a filtering criteria. In exemplary embodiments, the filtering criteria can include a specified similarity score threshold, and the filtering module 254 can be executed to compare the similarity scores, generated by the scoring module 252 for each of the trademarks, to the specified similarity score threshold. Trademarks having a similarity score that exceeds the specified threshold can satisfy the filtering criteria and can be deemed to be confusingly similar by the candidate filtering module 254. The trademarks that are deemed to be confusingly similar to the order can be output as a filtered set of results 270 from the candidate presentation engine 250, and can be reported to a user by transmitting the filtered set of results to a user device via a communication network. Trademarks having scores that do not exceed the similarity score threshold are not transmitted to the user devices. Upon receiving the filtered results set, the user device can render the filtered results set in a GUI displayed on a display unit associated with the user device.

Exemplary embodiments of the information retrieval system 200 can advantageously provide improved searching abilities compared to conventional search engines and processes to provide comprehensive search results that go beyond simply submitting what a user provides as search terms to a repository in the form of a query and simply returning the results of such a query to a user.

Figure 3:
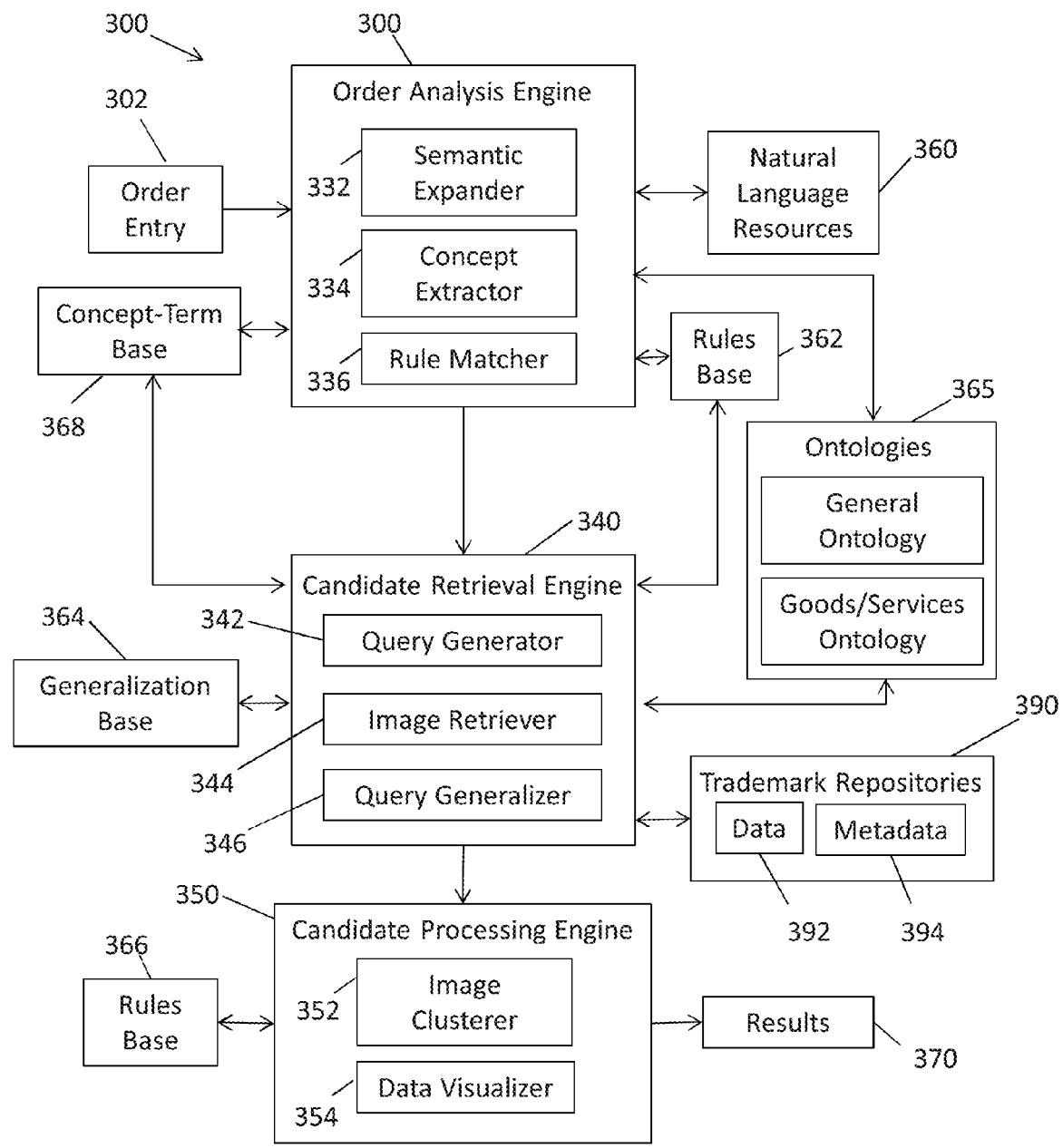
FIG. 3 is a block diagram of an exemplary embodiment of an information retrieval system that identifies confusingly similar image-based trademarks or service marks (e.g., trademark images or logos with or without words) based on a user supplied search order or request.

FIG. 3 is a block diagram of an exemplary embodiment of an information retrieval system 300 that identifies confusingly similar image-based trademarks or service marks (e.g., trademark images/logos with or without words) based on a user supplied search order. The system 300 can include an order analysis engine 330, a candidate retrieval engine 340, and a candidate presentation engine 350. The system 300 can receive as an input one or more orders including text-based strings in natural language that describe images. In response to an order, the system 300 outputs a set of trademark images (e.g., logos) that are ranked for relevance against text-based input stings of the order, i.e., images that contain a subset/combination of the concepts submitted in the text-based string.

Similar to the system 200, the system 300 makes trademark image retrieval accessible for non-professional trademark researchers as well as others (conducting such activities as trademark clearance, trademark infringement review, logo design, and the like). Users can simply describe the type of images to be searched in their own words and language without knowing anything about an underlying image encoding system utilized by trademark repositories (or databases) 390, which stores data 392 in the form of trademark images and metadata 394 associated with the trademark images. The system 300 further provides for easy integration into any other system or workflow that at some point in time has a piece of natural language text available that describes what is (or should/can be) in a trademark image, and needs to provide a set of relevant trademark images for that description.

In exemplary embodiments, a user of the system 300 can submit, via one or more graphical user interfaces, a search order 302, which includes a text-based string describing image concepts as well as an indication of which trademark repositories, classes of images, goods/services associated with the described image, and/or jurisdictions the system 300 should search to identify trademark images that may be confusingly similar to the concepts described in the search order. In response to the order 302, the system 300 can output a set of results that have been specifically generated to provide the user with a set of registered, trademarked images/graphics (with or without words) that may be confusingly similar to an image/graphic described by the text-based input strings of the order 302 (e.g., based on an operation of the engines 330, 340, and 350). In some embodiments, the results output by the system 300 can be restricted to jurisdictions and international classes specified in the order 302. In some embodiments, the system 300 can return all of the trademark images retrieved without filtering. The results output by the system 300 can include relevant information about the trademarked images to identify, for example, the trademark office that published trademark document, the registration number, the date of registration, the owner of the trademarked image, the next renewal date or window, and/or any other suitable information about the trademarked image.

The order analysis engine 330 can include a semantic expander 332, a concept extractor 334, and a rule matcher 336. In exemplary embodiments, the order analysis engine 330 can receive the order 302 including a text-based string from a user device. The order 302 describes a trademark image/logo using natural language terms, for example, by describing each item of an image separately. In some embodiments, the order 302 can supply a single input describing what needs to be in an image without explicitly separating the terms. To aid in illustrating an operation of the system 300, as a non-limiting example, the user can provide an order to search for images that feature at least a five-pointed star and an appaloosa, among possible other elements. For example, such an order can be include a text-based string set {"a star with five points", "appaloosa"} in a simple case, and {"a star with five points together with an appaloosa"} in the more advanced case. The text-based string set included in the order can be passed to the concept extractor 334 to be processed as described herein.

While conventional systems support the use of isolated terms as found in various encoding standards (or direct synonyms thereof), in exemplary embodiments of the system 300, the terms and synonyms can be used within a more open natural language context. This provides a user with more freedom in specifying the text-based string of the order. For example, the text "five pointed star" can just as well be expressed as, e.g., "a star with five points" or "stars having 5 arms", and regardless of which expression is received, the system 300 is programmed to return the same set of trademark images. By allowing natural language to be used as input instead of strict terminology and/or codes, exemplary embodiments of the system 300 advantageously eliminate the requirement that a user have special knowledge for interacting with the trademark image repositories, and allow for non-human and human input to provide text describing what should be featured on the trademark images.

The concept extractor 334 processes each element/term of text-based input string set in the order 302 and determines which concepts are potentially triggered by the input string set. For each element, the list of terms included in the input string set is analyzed to identify key words and phrases maintained by a concept-term base 368 of the system 300. For example, the concept-term base 368 can relate or link synonyms, near synonyms, hyponyms, and the like to one or more concepts. The concept extractor 334 can scan the concept-term base 368 to for the terms in the input string and upon locating the terms can identify the corresponding concept(s) associated with the terms. Terms in the input string set that are not recognized by the concept extractor 334 are analyzed to determine whether the unrecognized terms connect ("glue") the content of the text-based input together in a manner consistent with an expression provided in natural language, but with no relation to recognized concepts themselves. To distinguish between recognized and unrecognized words, a list of common words is provided in one or more human languages and is combined with information extracted from the semantic expander 332 (e.g., semantically equivalent words). Using the list of recognized words in combination with the information extracted by the semantic expander 332, the order analysis engine 330 extracts a set of possible concepts that are present in the order 302. Once the words and phrases of the order 302 have been processed through the semantic expander 332, the set of concepts representing the words and phrases in the order 302 (e.g., "orange" can either be a type of fruit or a color so both of these concepts can be considered present) is passed to a word recombiner function of the semantic expander 332, which combines words in an order. Exemplary embodiments of the system can receive text-based input strings in natural language in different ways (e.g., as a single string, as a set of strings). If the system receives a set of text-based input strings, the word recombiner function can operate to process the separate input strings in the set to recognize separate and distinct concepts, but also to recognize when different strings within a set can be combined in one or more combination or permutations into single words or strings. Continuing with the example, based on the output of the concept extractor 334 and the semantic expander 332, the order analysis engine 330 can map the text-based input "a star with five points" to a set of concepts {_isFivePointedStar,_isFive,_isPoint,_isStar} and can map "appaloosa" to a concept {_isHorse}. That is, the string "a star with five points" is mapped onto the concept _isFivePointedStar, as a whole, but also has terms that are individually map to the concepts _isFive ("five"), _isPoint ("points") and _isStar ("star").

By modeling the logic for the rules as described herein, exemplary embodiments of the system 300 advantageously provide an enriched set of rules that can be used to determine which terminology or combinations of terms should trigger specific codes (or logic combinations thereof), and can allow for using concepts instead of terms, making the models more generic.

The semantic expander 332 can utilize one or more repositories of concepts (e.g., one for each supported human language), which can be derived from one or more low-level image encoding schemes of one or more trademark repositories 390 to ensure all recognized concepts are covered, and that only the recognized concepts are covered. The concepts stored in the repositories can include features, such as a unique name and a list of natural language terms that correspond to the concept. This allows the semantic expander 332 to map individual terms or sequences of terms onto a set of recognized concepts. For example, the concept _isHorse can be correspond not only to the terms "horse" and its plural "horses", but also to synonyms, such as the Latin "equus caballus", as well as near synonyms, such as "pony" and hyponyms, such as all types of horse breeds, including "appaloosa" and/or any other sutiable natural language terms that can be expressed as being semantically related.

Through automatic expansion combined with manual validation and additional ad hoc manual expansion, a list of understood synonyms can be maintained by the system 300 that far exceeds what may be conventionally supported. By supporting hyponyms, the system 300 can even map very specific descriptions onto concepts to facilitate retrieval of the correct images (e.g., images that would be considered confusing similar to that which is described in the order), which advantageously allows the system 300 to receive and process a wide variety of inputs describing the same or similar images; thereby reducing, for example, the number of error messages generated in response to orders as well as reducing the frustration and level of effort of the users of the system 300.

The rule matcher 336 uses the concepts identified by the concept extractor 334 and semantic expander 332 to determine which rules of the rules base 362 should be triggered to generate one or more queries. The rules of the rule base 362 can include conditional logic that has been defined based on input from expert trademark search analysts. Each rule in the rules repository can have a corresponding rule name, retrieval logic, and/or match logic. The rule name can be used to identify and distinguish one rule from another, and can be used to retrieve the rules from the rules repository. The retrieval logic can state which (logical combinations of) codes should be retrieved by the rule matcher for use in generating one or more queries. In exemplary embodiments, combinations of codes can be defined in terms of the logical operators AND, OR and NOT. In some embodiments, if a piece of logic used here was already defined before, the name of the defining rule can be used instead of the code itself. The match logic of the rule matcher 336 can state which (logical combinations of) concepts should be present for a corresponding rule to trigger. In exemplary embodiments, combinations of the concepts can be defined in terms of logical operators AND, OR, and NOT, as well as, a tuple-operator that indicates compound concepts, i.e., concepts that are formed from multiple other concepts.

As an example, consider a definition of rules that define, among other things, what needs to be retrieved when a user wants to see images featuring a dressed lion:

```
>isGriffin        040501      _isGriffin
>isSphinx         040302      _isSphinx
>isLion           030101 | isHeraldiclion | isSphinx | isGriffin _isLion
>isLioness        isLion _isLioness
>isLioninsignia   isHeraldiclion (_isLion,_isInsignia) | (_isLion,_isHeraldry) |
(_isLion,_isShield)
>isHeraldiclion   030102      _isHeraldicLion
>isCostumedLion   isLion & isCostumedanimal0301    (_isCostumed,_isLion)
>isCostumedanimal0301    030126
```

The third line in the above example shows the definition of the concept lion and indicates that if a user wants to see lions, the system 300 should also retrieve images that include sphinxes and griffins, as well as those images that have lions in heraldic style, which have a different coding than regular lions. The OR operator '|' indicates that the presence of any of these codes is sufficient for the rule to trigger. The rule matcher 336 outputs, for each input element (e.g., each word in the text-based string), sets of rules that are triggered for the element.

The second to last line in the above example, beginning with "isCostumedLion", shows the definition of the concept of a dressed lion. For it to trigger, an order must include terminology referring to the concept of being clothed as well as to the concept of lion and that such an order should be described in the context of a single, compound concept (e.g., so the input string should have been, for example, {"a dressed lion"} or something semantically similar). If the latter condition does not hold, e.g., for an input like {"a lion","clothing"}, the system 300 will retrieve, in addition to images of clothed lions, images with a lion that includes another element that has to do with clothing. If the second to last line triggers, the system 300 will retrieve all images that have both the code for lion AND the code for costumed animal of category 0301 (which is the encoding category of, among other things, the lions). In some embodiments, for reasons of coverage completeness, the concepts lion and being clothed can be combined, using the word recombiner function, into the concept of a dressed lion so these concepts are retrieved as well.

Continuing with the running example for "a five pointed star", "appaloosa", the rule matcher 336 can identify the following rules:

```
>isFivepointedstar    010108 _isFivePointedStar | (_isFive,_isPoint,_is-
                             Star) |
(_isFive,_isArm,_isStar) | (_isRepresenting,_isFive,_isPoint,_isStar) |
(_isRepresenting,_isFive,_isArm,_isStar)
>isHorse              030501      _isHorse
```

Based on the above, the rule matcher 336 outputs the rules set {{isFivepointedstar},{isHorse}} having corresponding low level retrieval codes 010108 and 030501, respectively. The actual parts of the matching logic that correspond to the order are "(_isFive,_isPoint,_isStar)" and "_isHorse". Since the matching logic for the "isFivepointedstar" rule is an OR statement of five options with one of these five being true, the entire statement is true, and hence the rule is triggered by the rule matcher 336. The "isHorse" rule (the concept for horse) is triggered because a horse is defined in the semantically expanded repository as, among other things, appaloosa.

In some embodiments, the rule matcher 336 can treat the matching parts of the rules as concept vectors, and can do the same with the concepts derived from the user input. Then, in a vector space defined by the rule vectors, the distance of the input vector to each of the rules can be determined. In this manner, the input can be restricted to a single string (with much more natural language freedom than conventional techniques) that will trigger any rule close enough (i.e. below a certain distance threshold). In one embodiment, vector difference is measured only after the rule match 336 executes natural language processing and determined that the input string can be split-up between positive and negative parts of text, where the positive parts are used to retrieve trademark images and negative parts are not used to retrieve trademark images or are used to filter out retrieved trademark images. Using the above described vector processing, the rule matcher 336, can return all (to a high degree of probability) valid results. Moreover, the retrieval logic of the rules also facilitates retrieval of trademark images using more than the basic code to which the input string is matched. By creating rules that include conditional logic to mimic or simulate years of retrieval experience of subject matter experts, exemplary embodiments of the system 300 provide for improved certainty that all relevant trademark images are retrieved and shown to the requesting user as compared to conventional systems that do not include such sophisticated rules.

In exemplary embodiments, the order analysis engine 330 can process the one or more strings associated with the goods/services specified in the search order. For example, the order analysis engine 230 can interface with one or more ontologies 365, such as a general ontology and a goods/services ontology. The ontologies 365 can be utilized to identify semantically related words. For example, the goods/services ontology can be utilized by the order analysis engine 230 to identify goods/services that are semantically related to the goods/services specified in the search order 302. The goods/services ontology can include a repository of terms (e.g., such as common terms for goods and services) and can be structured such that semantically related terms are linked or otherwise associated with each other. When a term in the goods/service specified in the search order is compared against the terms in the goods/services ontology, the goods/services ontology can map the term to its semantically related terms, and the order analysis engine 330 can use the semantically related terms to generate the search strategy.

The candidate retrieval engine 340 can include a query generator 342, an image retriever 344, and a query generalizer 346. The query generator 342 of the candidate retrieval engine 340 receives the set of sets of rules that are triggered during processing of the order by the order analysis engine 330 (e.g., one set of rules for each recognized concept), which in continuing the example from above would be: {{isFivepointedstar},{isHorse}}. Using the set of sets of rules, the query generator 342 generates all combinations that feature exactly one rule from each set. For every such rule combination, the query generator 342 extracts retrieval logic from the rule combination, and through continuous substitution (if needed) transforms the retrieval logic into a query including a logic statement (with AND, OR and NOT operators), which combines low level retrieval codes attached to the images. For the "five pointed star", "appaloosa" example, the low level retrieval codes can be expressed as follows:

010108 AND 030501

The query generator 342 uses continuous substitution when the code logic of a rule features other rules' code logic in addition to the low level retrieval codes. Trademark images in the trademark repository can be associated with one or more low level retrieval codes. For example, the low level retrieval code 010108 can be associated with all trademark images in the trademark repository that correspond to the "isFivepointedstar" rule including semantic equivalents, and the low level retrieval code 030501 can be associated with all trademark images in the trademark repository that correspond to the "isHorse" rule includes semantic equivalents.

In some embodiments, the one or more queries can include or otherwise be formed using specified classes or goods/service included in the search order (as well as their semantic equivalents). For example, the one or more queries can be limited to trademark from a particular class that includes goods/services specified in the search order or that are semantically related to the goods/service specified in the search (as determined by the goods/service ontology).

The image retriever 344 executes a query plan, including queries generated by the query generator 342 (e.g., a query for each combination of rules) in one or more query languages (from the example above, "010108 AND 030501"), to search for trademark images in one or more trademark image repositories.

In some embodiments, the candidate retrieval engine 340 can limit or otherwise control the retrieval of trademark images from one or more of the trademark repositories based on the goods/services specified. For example, certain rules and retrieval models can be associated with goods/services and can be sued by the candidate retrieval engine 340 to identify trademark images within the repositories that correspond to the goods/services specified in the search order. In some embodiments, the candidate retrieval engine 340 can be programmed to execute the rules and retrieval logic with logical connectors (e.g., AND, OR) between the query terms associated with the text-based input string associated with trademark terms and the text-based input string associated with goods/services. Using this approach the candidate retrieval engine 240 can be programmed to, for example, retrieval only those trademark images corresponding the trademark terms and having goods/services corresponding to the goods/services specified in the search order.

Using the queries, the image retriever 344 retrieves trademark images that match the criteria provided. If results are returned, the results are passed to the candidate presentation engine 350. If the queries fails to return any results, the query information is passed to the query generalizer 346.

The query generalizer 346 receives as input, the rule names triggered by the rule matcher 336 and outputs the according set of rule names to which the rules should be generalized. For example, for each rule in the original query or queries, the query generalizer 346 returns a generalized set of rule names. In some embodiments, the query generalizer can identify the concepts associated with the rule names that were used to generate the one or more queries, and can scan a generalization base 364 to identify a generalization of the concepts. The generalization base 364 can include a hierarchy of concepts and can relate concepts in the hierarchy from general to specific (or specific to general) such that each concept in the hierarchy can be associated with a hierarchical level. When performing a generalization, the query generalizer 346 can identify the concept that is one level higher (or more general) in the hierarchy and can use this more general concept to generate new queries (e.g., by identifying the rules that are associated with the more general concept and using the low level codes associated with the rules). Depending on the number of levels, L, the user or the system 300 specifies for expansion, and the number of query elements, E, the user or system 300 specifies for expansion, the image retriever 344 generates a new set of queries, and retrieves images (if any) satisfying the new set of queries. The level, L, determines whether, after the query generalizer 346 generalizes a certain rule into a more general rule, the more general rule should be generalized as well if needed (e.g., if no results are returned with the more general rule). Thus, the level, L, determines how many successive generalization steps the query generalizer 346 and query generator 342 are maximally allowed to perform—i.e. this controls how deeply the user or system 300 will allow queries to deviate from the original query. The query element, E, determines how many elements in one query should be generalized for each iteration of generalization, which controls how broadly the user or system 300 will allow the query generalizer 346 and query generator 342 to deviate from the original query. If no images are returned when all specified limits (e.g., as determined by L and E) are reached, an empty result can be returned. In the running example, the number of levels, L, can be set to one, and the number of elements, E, can be set to two, such that the system 300, upon finding no images that feature both a five pointed star together with a horse, would perform one iteration of generalization to generalize the rules by generalizing one or both of the terms.

In exemplary embodiments, in addition to the rule and term generalizations, the query generalizer 346 can broaden the query by modifying logical connectors of a query. For example, if a query includes a logical AND statement of a quantity, n, codes, the query generalizer 346 can generate all other AND statements of size I where 1<=I<n; thereby allowing the image retriever 344 to search for a monkey with a banana in a circle will also return images of a monkey with a banana without circle, or even images having just a monkey. Such images may be relevant to a trademark clearance, e.g., if the monkey has no banana and there is no circle, but the monkey depicted can be confusingly similar to the image of monkey for which the subject search is performed (e.g., in case of a search for potential trademark logo infringement).

The query generalizer 346 can be used to advantageously determine how to generalize queries in a way that mimics or simulates how a subject matter expert may generalize queries. The query generalizer 346 can advantageously eliminate the need, time and, burden for users to generate extra queries when no images are found in response to an original order, and can advantageously return images, based on generalized queries, that the user may not have thought of. Additionally, the query generalizer 346 advantageously imposes a natural order on the images returned by the system 300 from most specific to most general.

In the running example, if images that feature both a five pointed star AND a horse are not found, the query generator 342 or image retriever 344 can send one or more requests to the query generalizer 346 to generalize the rules isFivepointedstar and isHorse in consultation with a generalization rule database, which can include the following lines:

```
>isDonkey,isZebra,isMule    isHorse
>isStar isFivepointedstar
```

Based on the above, the query generalizer 346 output is {isStar} for the isFivepointedstar input and is {isDonkey, isZebra,isMule} for the isHorse input. Using this generalization, the system 300 would generalize the rules to search for images that include, for example, the following combinations.

a five pointed star and a donkey
a five pointed star and a mule
a five pointed star and a zebra
a star and a horse
a star and a donkey (only when E≥2)
a star and a mule (only when E≥2)
a star and a zebra (only when E≥2)

The following provides another non-limiting example of query generalization through a hierarchy of concepts that can be implemented by the candidate retrieval engine 340. When a user searches for a trademark image that contains "a church and a javan tiger", these consecutive steps can be taken by the candidate retrieval engine. First, the order analysis engine 330 or the candidate retrieval engine 340 can deduce which recognized concepts are contained in the order based on in information found in the concept-term base 368 (e.g., an ontology or other resource) that relates or links terms to concepts they represent. For example, the content-term base 368 can include the following:

_isChurch church,churches,church building,church buildings,basilica,basilicas,kirk,kirks
_isTiger tiger,tigers,panthera tigris,tiger cub,tiger cubs, tigress,tigresses,bengal tiger,bengal tigers,sabertoothed tiger,saber-toothed tigers,sabertooth,sabertooth tiger,sabertooth tigers,siberian tiger,siberian tigers,bali tiger,bali tigers,balinese tiger,balinese tigers javan tiger,javan tigers,sumatran tiger,sumatran tigers,caspian tiger,caspian tigers,hyrcanian tiger,hyrcanian tigers,turanian tiger,turanian tigers,turan tiger,turan tigers Based on the above, the term "tiger" and "javan tiger" can correspond to the concept "_isTiger" and the term "church" correspond to the concept "_isChurch".

Second, the candidate retrieval engine 340 can deduce which internal low level codes correspond to the identified concepts. For example, the candidate retrieval engine 340 can scan the rules base 362 for the concepts, which can return the following rules:

```
>isChurchCathedralAbbeyMonastery    070103    _isChurch | _isCathedral | _isAbbey | _isMonastery
>isTigerLargeFeline    030104    _isTiger | _isBigCat
```

Based on the above, as a third step, the candidate retrieval engine 340 queries the repository 390 for all images annotated with code 030104 AND 070103. If any images are found, the images are returned. If no images found, the candidate retrieval engine 340 generalizes retrieval by searching for concepts that generalize previously utilized concepts _isTiger and _isChurch, as described in the generalization base 364 (e.g., an ontology or other resource) that organizes all recognized concepts in a hierarchical manner. As shown below, the generalization base 364 can include the following:

```
_isReligiousBuilding    _isChurch
_isReligiousBuilding    _isPagoda
_isReligiousBuilding    _isMosqueMinaret
_isWildCat    _isLion
_isWildCat    _isTiger
_isWildCat    _isBigCat
```

Based on the above, the candidate retrieval engine 340 can retrieve images that either contain (1) a church and a lion (_isLion) or other wild cat (_isBigCat) like panther, cheetah, and the like, or (2) a tiger combined with another religious building like a pagoda (_isPagoda), a mosque, a minaret (_isMosqueMinaret), a temple (_isTemple), and the like. For example, the candidate retrieval engine 340 scan the rules base for rules associated with these concepts and can identify the corresponding low level codes to generate one or more queries. If this generalization does not yield any results, the candidate retrieval engine can identify additional generalizations by (1) allowing more concepts to vary (retrieve logo's that generalize _isTiger as well as _isChurch) or (2) generalize to higher levels in the concept hierarchy (e.g. to all cats instead of only wild cats, to all buildings instead of only ones that have to do with religion).

The candidate presentation engine 350 can receive the images retrieved by the candidate retrieval engine 344 and can output the results by transmitting the results to a user device to be rendered in a graphical user interface displayed by a display unit of the user device. The candidate presentation engine 350 can include the image clusterer 352 and data visualizer 354.

The image clusterer 352 compares metadata (e.g., owner, applicant, encoding, classes, registers, and the like) associated with all images returned in response to the order as well as some image data such as a color distribution or histogram associated with the images. The image clusterer 352 includes logic that allows the image clusterer 352 to group related trademark images, identical trademark images, and/or old/newer versions of the same brand logo together based on the metadata and image data so that images sharing common parameters can be displayed together (e.g., next to each other), which cannot be achieved based on processing of the image itself due to potentially large differences between image pixel data of images.

In some embodiments, the image clusterer 352 can group and/or rank the returned images based on color, using a distance metric between color values (e.g. based on the Pantone color index) in combination with the percentage of the image each color covers. Within this ranking, the images can be grouped or further ranked based on their respective metadata to keep related images together, despite color differences. For example, images can be grouped together with respect to the dominant colors or color combinations, while still keeping images associated with the same owner and associated with the same product (e.g., goods, services, brand, and the like) together. Continuing with the running example, if a user was trying to identify confusingly similar trademark images that include a large red five pointed star and a blue appaloosa, where no other colors are really present to a significant extent. The image clusterer 352 can cluster the images returned by the candidate retrieval engine 340 such that images dominated by red and blue being displayed first (e.g., with the images having combined color distance and distribution over red and blue that most closely correspond to the color of the star and appaloosa being first) and images having either less similar reds or blues or in a totally different ratio being displayed last.

By clustering images based on metadata and/or image data (including color data), exemplary embodiments of the present disclosure provide an output that makes it easier and less time consuming for a user to find the most relevant images and provides. In some embodiments, the user can interact with a graphical user interface to influence the way the images are sorted and/or grouped by the image clusterer 352. Once clustering is completed, the final selection can be passed to the data visualizer 354 for presentation.

The data visualizer 354 prepares and presents the final data for viewing by a user. For example, the data visualizer can cause the system to transmit search results 370 (i.e. the returned images) and presentation instructions to the user device, and the user device in response to the presentation instructions, can render the images in an arrangement in a graphical user interface displayed by the display device according to the clustering provided by the image clusterer 352. The form of visualization can be online (webpage), report (electronic or printed), graphs or charts, or any other suitable form of visualization.

In some embodiments, the candidate presentation engine 350 can apply one or more filters to images returned by the candidate retrieval engine 340 such that the system 300 can output a reduced (or filtered) set of images to be viewed by a user. For example, the candidate presentation engine 350 can use processes similar to those described herein with relation to the candidate presentation engine 350.

Figure 4:
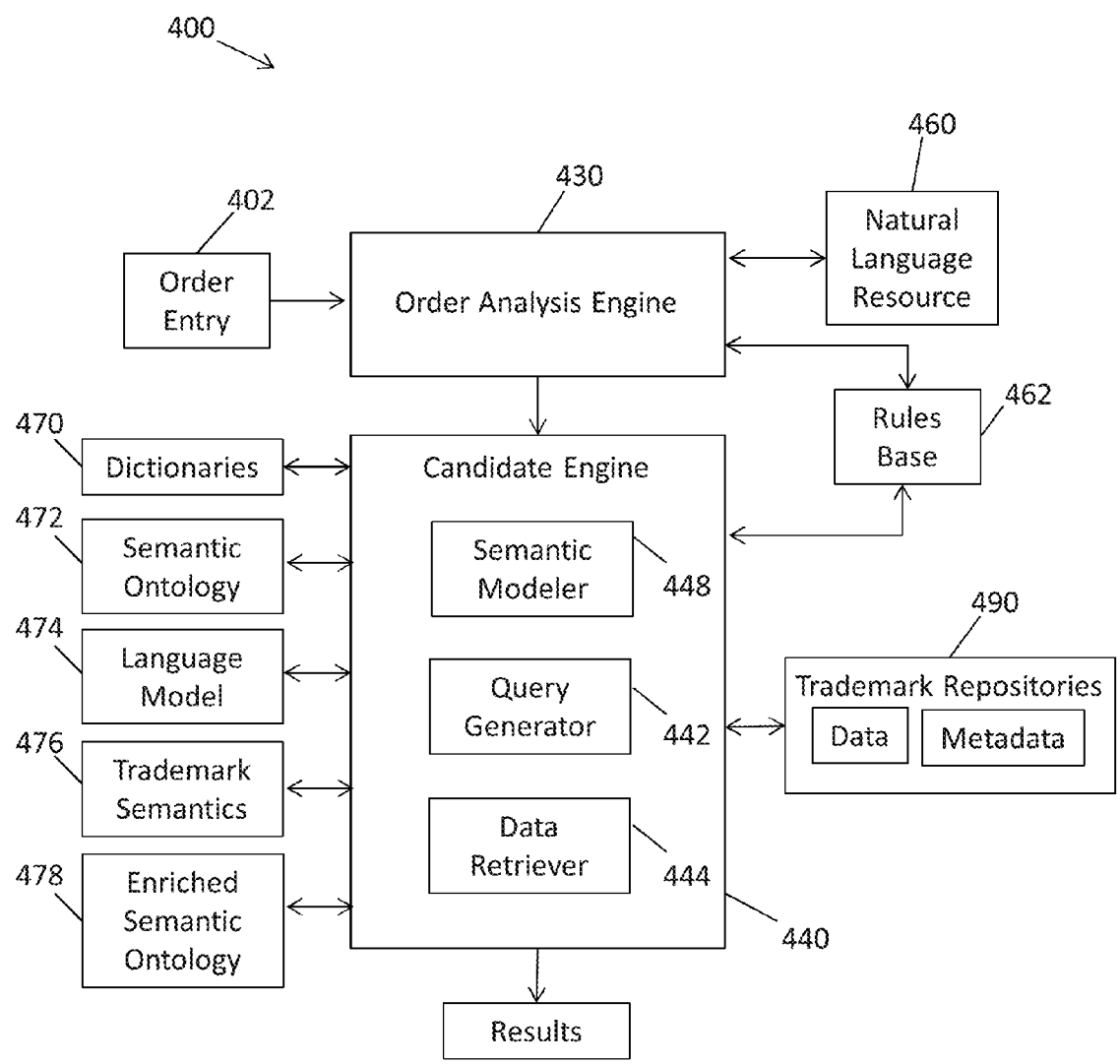
FIG. 4 is a block diagram of an exemplary embodiment of an information retrieval system that identifies confusingly similar trademarks or service marks utilizing semantically related terms identified according to a semantic model.

FIG. 4 is a block diagram depicting an information retrieval system 400 for implementing a search engine in accordance with exemplary embodiments of the present disclosure. In exemplary embodiments, the information retrieval system 400 can be implemented by one or more servers and one or more repositories, which can communicate directly with each other and/or may communicate with each other via one or more communication networks as described herein. The system 400 can include an order analysis engine 430 and a candidate engine 440. In exemplary embodiments, the order analysis engine 430 can be implemented using the order analysis engine 130, 230, or 330 as described herein in conjunctions with the various elements described in relation to the order analysis engines 130, 230, and 330 (e.g., natural language resources 460, rules bases 462).

The candidate engine 440 can include a query generator 444, a data retriever 446, and a semantic modeler 448. In exemplary embodiments, the query generator 444 can be implemented using the query generator 242 or 342, and the data retriever can be implemented using the retriever 244 or 344. The semantic modeler 448 can use a voting scheme to unify different resources/approaches to identifying semantic equivalents and semantic relatedness.

Some examples of different resources/approaches that the semantic modeler can interact with include one or more dictionary repositories 470, a semantic ontology 472, a (statistical) language model 474, a trademark semantics resource 476, and an enriched semantic ontology. The dictionary repositories can include words from a large set of languages. Words in the dictionary repositories can be considered semantically related if they translate to the same concept. The semantic ontology 472 stores relationships like synonymy, antonymy, hyponymy, and alike of various words and/or phrases. The language model 474 includes results of training a language model to obtain word embeddings where vector logic (e.g., cosine similarity or any other vector distance measure) is used to compute semantic distance between words such that words within a specified semantic distance of each other are considered semantically related. The semantic trademark resource 476 can include semantic alternatives mined from human annotations in a full backlog of trademark searches maintained by the system 400. The enriched semantic ontology 478 can be similar to the ontology 472, but can include semantic clusters derived from the ontology 472. The ontology 478 can be organized in a hierarchy to allow for extra flexibility as this creates a natural degree of semantic relatedness.

Each of the example resources can have specific strengths and specific weaknesses, such that none of the resource can be used alone to provide a complete or accurate semantic model for trademarks. The approach to get to a complete and accurate model is by identifying those combination of patterns of the aforementioned resources of the semantic modeler 448 that lead to valid results based on historic data and/or training data. The semantic modeler 448 can interact with each of the resources to identify whether each of the resources consider which words the resources consider to be semantically related to a term or element. A resource may vote for a particular word by indicating that it is semantically related to a term. The semantic modeler 448 can consider the votes from the resources to select the most correct, accurate, or appropriate semantic relationships based on the voting patterns of the resources. For example, it can be determined that certain voting patterns can provide correct semantic relationships. The voting patterns can be integrated into logic of the semantic modeler 448 that decides which conditions allow for which patterns to be used.

Using this voting approach, the semantic modeler 448 can accurately identify semantically related words based on the evidence of semantic relationship present as determined by the voting patterns, which can increase a number of words that can be utilized in addition to the matching words. A voting pattern can be represented by a set P of triplets (r, rw, rs) where each triplet originates from one of the resources used. The 'r' in the triplet corresponds to an indentifier of the particular resource, the 'rw' corresponds to a weight assigned to the resource 'r', and the 'rs' corresponds to the normalized scoring of the resource r for the term for which other semantically related terms are desired.

After a validation process that identifies which (order, trademark) couples are valid and/or accurate (i.e., good couples) and which are not in the context of semantic relatedness, the weights rw can be tuned to find the optimal balance between maximal coverage of the good couples versus minimal inclusion of the couples that are not considered to be good from the validation process. This process leads to a set PS of patterns P that allows for automatic retrieval of order-trademark couples from repositories (or databases) 490 that are deemed to be (confusingly) similar to the an input string of an order 402 without requiring an filtering or query generalization; thereby potentially reducing the use of resources required to conduct and a search and prepare result sets. For example, the query generator 444 can generate one or more queries encompassing the semantic equivalents identified by the semantic modeler 448 using one or more rules including retrieval logic, and the data retriever 446 can retrieve only those trademarks that correspond to the identified semantic equivalents such that the system identifies and returns only those trademarks the system 400 deems to be confusingly similar to the text-based input strings received by the system 400.

While embodiments of the systems 100, 200, 300, and 400 have been illustrated as separate systems in FIGS. 1-4, in exemplary embodiments, the systems 100, 200, 300 and/or 400 can form a single system that includes all or some of the functionality and structure of the systems 100, 200, 300 and/or 400. For example, in exemplary embodiments, the system 100 can include one or more of the systems 200, 300, and/or 400, where the functionality supported by the systems 200, 300, and/or 400 can be executed based on input received from the user (e.g., when the user submits an order to search for word marks, the system 200 or the system 400 can be executed, and when the user submits an order to search for trademark images (e.g., logos), the system 300 or the system 400 can be executed. Furthermore, while exemplary embodiments of the systems 100, 200, 300, and/or 400 have been illustrated as having various components, the systems 100, 200, 300, and/or 400 may have more or fewer components and the components may combined or integrated with one another.

Figure 5:
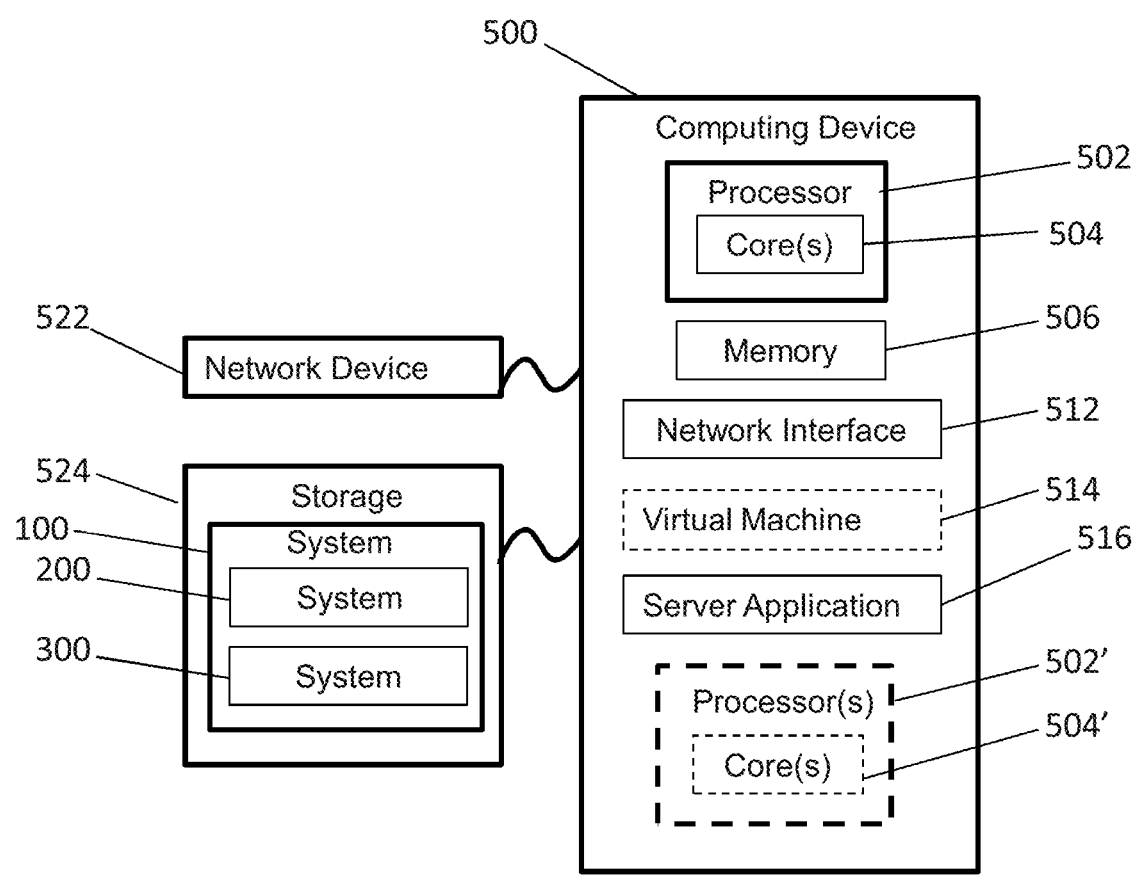
FIG. 5 depicts an exemplary server for implementing embodiments of the information retrieval system in accordance with exemplary embodiments of the present disclosure.

FIG. 5 depicts a block diagram of an exemplary computing device 500 that can be utilized to implement embodiments of the information retrieval system (e.g., the systems 100, 200, 300, 400). For example, the computing device 500 can be implement embodiments of the information retrieval system 100 that includes the systems 200 and 300 or portions thereof. In the present embodiment, the computing device 500 is configured as a server that is programmed and/or configured to execute one or more of the operations and/or functions of the information retrieval system and to facilitate communication with user devices (e.g., user devices 104a-b). The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 506 included in the computing device 500 may store computer-readable and computer-executable instructions or software for implementing exemplary embodiments of the information retrieval system or portions thereof. The computing device 500 also includes configurable and/or programmable processor 502 and associated core 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' may each be a single core processor or multiple core (504 and 504') processor.

Virtualization may be employed in the computing device 500 so that infrastructure and resources in the computing device may be shared dynamically. A virtual machine 514 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof.

The computing device 500 may also include one or more storage devices 524, such as a hard-drive, CD-ROM, mass storage flash drive, or other computer readable media, for storing data and computer-readable instructions and/or software that can be executed by the processing device 502 to implement exemplary embodiments of the systems described herein. For example, FIG. 5 shows system 100 stored in storage 524, where system 100 includes embodiments of the systems 200 and 300 or portions thereof.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. The network interface 512 may include a built-in network adapter, network interface card, PCMCIA network card, card bus network adapter, wireless network adapter, USB network adapter, modem or any other device suitable for interfacing the computing device 500 to any type of network capable of communication and performing the operations described herein. While the computing device 500 depicted in FIG. 5 is implemented as a server, exemplary embodiments of the computing device 500 can be any computer system, such as a workstation, desktop computer or other form of computing or telecommunications device that is capable of communication with other devices either by wireless communication or wired communication and that has sufficient processor power and memory capacity to perform the operations described herein.

The computing device 500 may run any server application 516, such as any of the versions of server applications including any Unix-based server applications, Linux-based server application, any proprietary server applications, or any other server applications capable of running on the computing device 500 and performing the operations described herein. An example of a server application that can run on the computing device includes the Apache server application.

Figure 6:
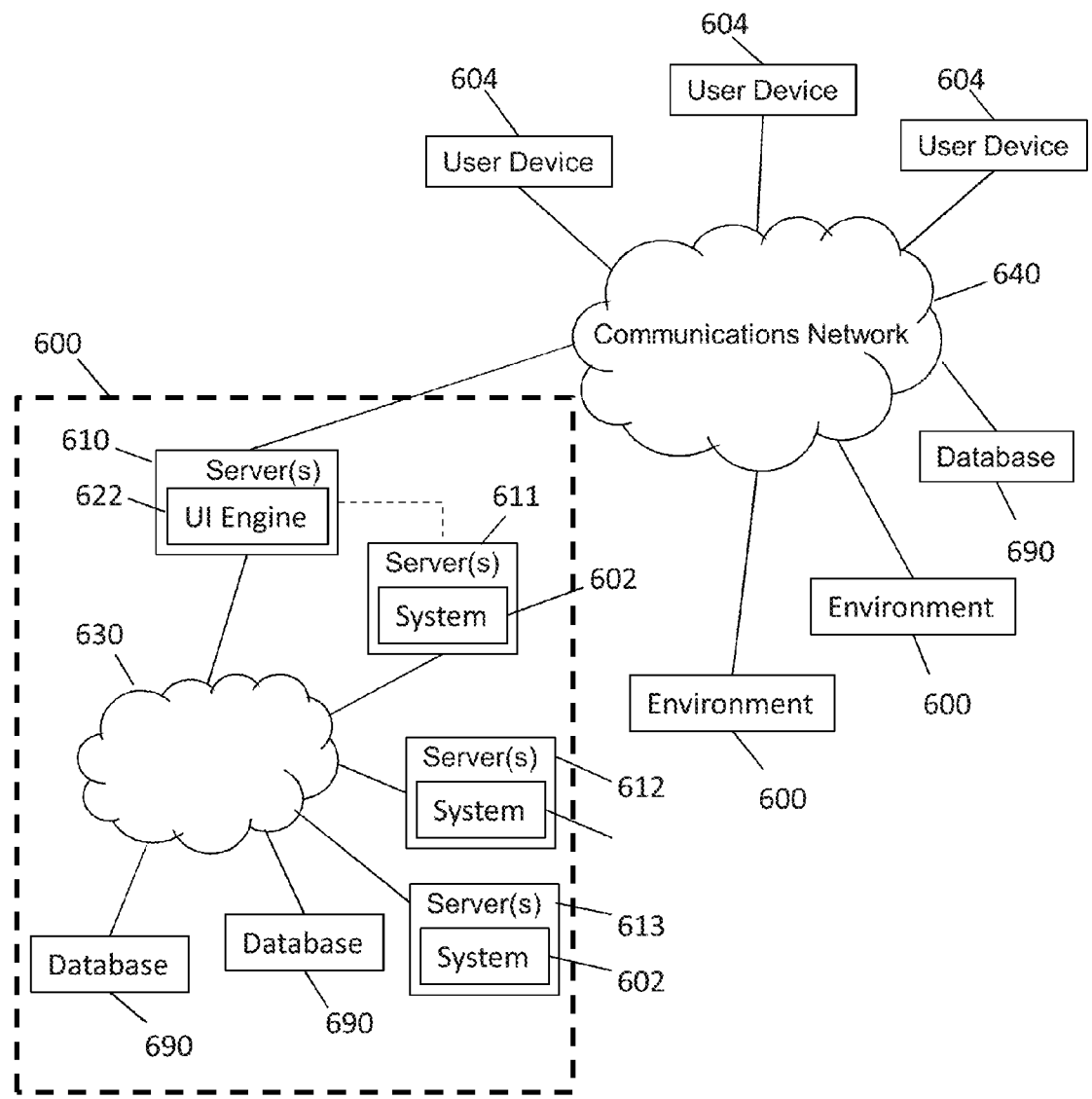
FIG. 6 depicts an exemplary distributed server environment for implementing embodiments of an information retrieval system in accordance with exemplary embodiments of the present disclosure.

FIG. 6 depicts an exemplary distributed server environment 600 for implementing instances of embodiments of an information retrieval system 602 or portions thereof in accordance with embodiments of the present disclosure, as shown, for example, in FIGS. 1-3. As shown in FIG. 6, the environment 600 can include servers 610-613, repositories (or databases) 690 (e.g., source repository 190, repositories 290 and/or repositories 390, repositories 490), which can be operatively coupled to each other through a communication network 630. The communication network can be implemented as an Intranet, virtual private network (VPN), wide area network (WAN), local area network (LAN), and/or other suitable communication network.

Any one of the servers 610-613 can be programmed to implement instances of the information retrieval system 602 or portions thereof including embodiments of the user interface engine, the order analysis engine, the candidate retrieval engine, and/or the candidate presentation engine described herein, as well as, any rules and other operations described herein including for example natural language processing using natural language resources (e.g., the servers 610-613 can be collectively programmed to implement embodiments of the information retrieval system). In some embodiments, particularly servers can be programmed to implement particular portions of the system 602 such that the group of server is collectively programmed to implement embodiments of the information retrieval system (e.g., the server 611 can execute instances of the order analysis engine; the server 612 can execute instances of the candidate retrieval engine; and the server 613 can implement instances of the candidate presentation engine). In the present example, the server 610 can execute a user interface engine 622 to facilitate interaction between user devices 604 and the instances of the information retrieval systems 602. The server 610 can receive search orders and provide presentation instructions and the search results to the requesting user devices 604. The presentation instructions can be used by the user devices 604 to render the search results via one or more GUIs.

The user devices 604 can be operatively coupled to the sever 610 via a communication network 640, which can be the Internet, a wide area network (WAN), local area network (LAN), and/or other suitable communication network. The user devices 604 can initiate communication with the server 610 to establish communication sessions and can submit one or more search orders to the server 610. Upon receipt of a search order, the server 610 can interact with the servers 610-613 to process the order by executing embodiments of the user interface engine 622, which may correspond to the user interface engine 122, executing embodiments of the order analysis engine (e.g., order analysis engine 130, 230, 330, 430) to generate a search strategy; executing embodiments of a candidate retrieval engine (e.g., candidate retrieval engines 140, 240, and/or 340 or candidate engine 440) to generate one or more queries in one or more query languages based on the search strategies and retrieve trademarks and metadata from the one or more repositories 690, which may correspond to the repositories 190, 290, and/or 390; and executing embodiments of the candidate presentation engine (e.g., candidate presentation engines 150, 250, and/or 350 or candidate engine 440).

FIGS. 7-14 depict exemplary graphical user interfaces (GUIs) that can be displayed on a user device in response to data and instructions received from embodiments of the system(s) (e.g., systems 100, 200, 300, and/or 400). The GUIs can allow a user to interact with the system by generating an order and transmitting the order from a user device to one or more servers executing the system or portion thereof, e.g., as described with reference to FIG. 6. The GUIs can also present search results via the GUIs in response to received orders by transmitting results data and instructions from the one or more servers to the user device.

Figure 7:
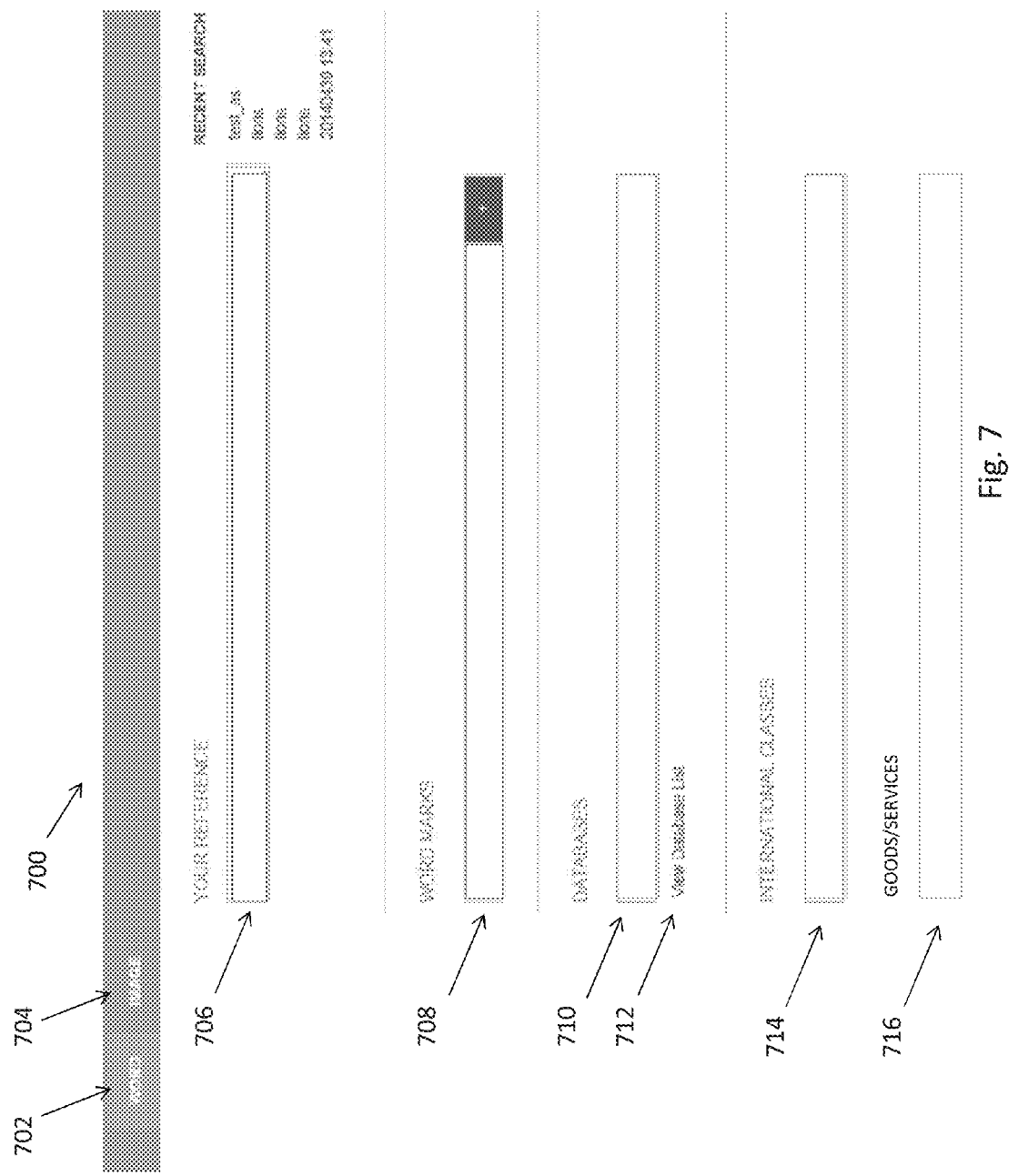
FIG. 7 depicts an exemplary graphical user interface that can be rendered on a display of a user device in response to data and one or more instructions being transmitted to the user device based on an execution of the information retrieval system shown in FIG. 2.

FIG. 7 depicts an exemplary graphical user interface 700 that can be rendered on a display of a user device in response to data and one or more instructions being transmitted to the user device in response to an execution of the system 200 or 400 shown in FIG. 2 or 4. For example, to begin the user can select to search for word marks by selecting a link 702 or can select a link 704 to search for trademark images. As shown in FIG. 7, the user has selected the link 702.

The GUI 700 can include data entry fields 706, 708, 710, 714, 716. The data entry field 706 is provided by the GUI 700 to allow the user to enter a user reference to associate with the search. The data entry field 708 is provided by the GUI 700 to allow the user to enter one or more terms (e.g., corresponding to a trademark for which the user wishes to identify confusingly similar trademarks). The data entry field 710 is provided by the GUI 700 to allow the user to specify which repositories the user wishes to have the system 200 or 400 search. In exemplary embodiments, the user may begin typing the names of repositories and the system 200 or 400 can utilize an automatic completion function to identify and select a particular repository or the user can select a link 712 to open another GUI to provide a list of repository that can be selected by the user. The data entry field 714 is provided by the GUI 700 to allow the user to specify which international classes the user would like to include in the search (e.g., based on the type of goods or services that are or will be associated with the terms entered in the data entry field 708). The data entry field 716 is provided by the GUI 700 to allow the user to specify goods or services that are or will be associated with the terms entered in the data entry field 708, and which can be expanded upon by the system as well as used by the system to identify and return marks that may be confusingly similar to the terms provided in the data entry field 708. Once the user has entered the information in the data entry fields 706, 708, 710, 714, and/or 716 the user can submit an order including the information to a distributed server environment for processing by the system 200 or 400.

Figure 8:
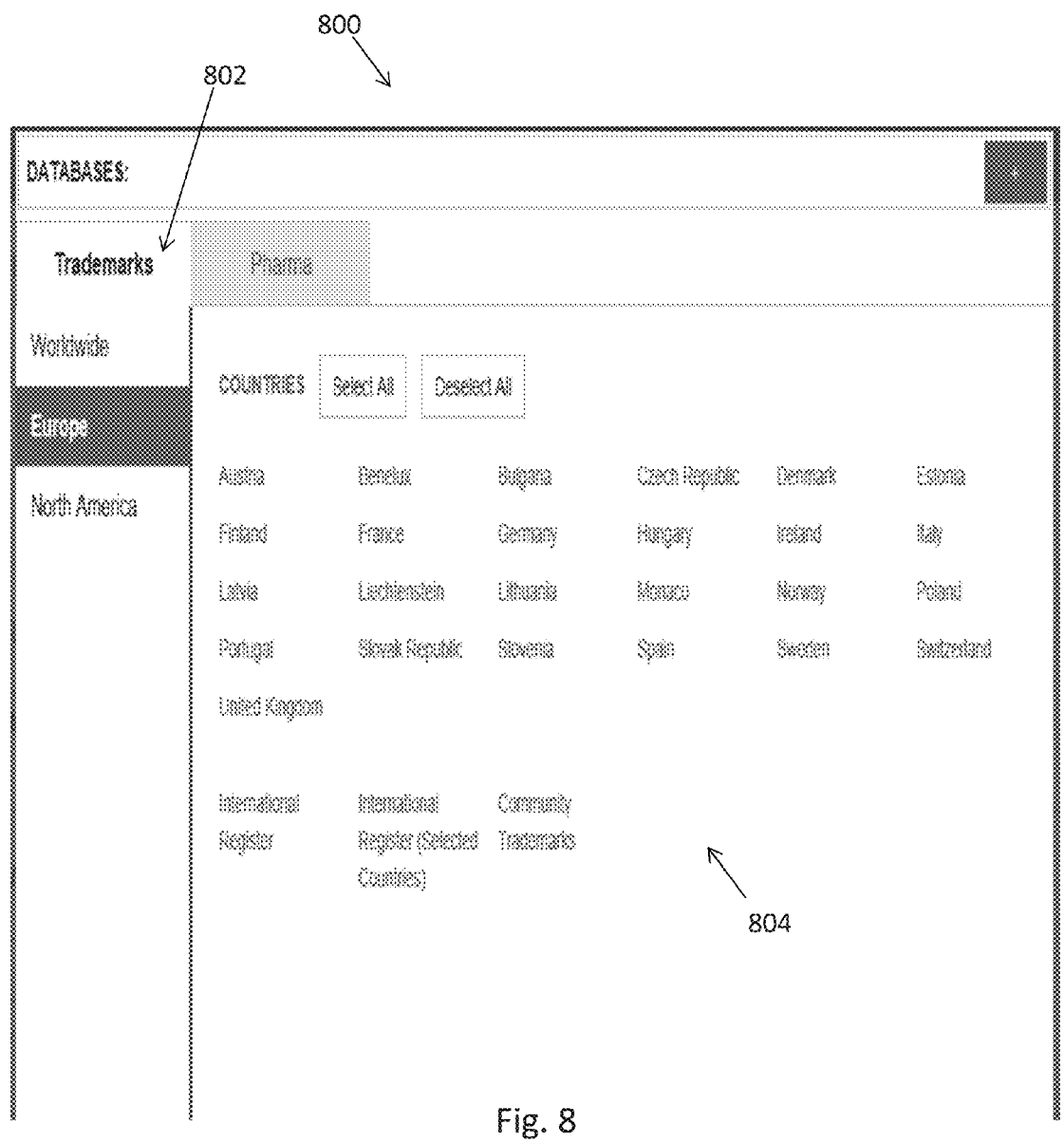
FIG. 8 depicts an exemplary graphical user interface that can be rendered on a display of a user device to provide a list of selectable repositories that can be included in a search order.

FIG. 8 depicts an exemplary graphical user interface 800 that can be rendered on a display of a user device to provide a list 804 of selectable repositories that can be included in the order. As shown in FIG. 8, the GUI 800 can include links 802, which can be selected by the user to provide lists of repositories by geographic location (e.g., worldwide, Europe, North America). For example, FIG. 8 shows repositories associated with trademark repositories for European countries. To include the repositories listed in the GUI 800 in a search order, the user can select the repositories from the list 804.

Figure 9:
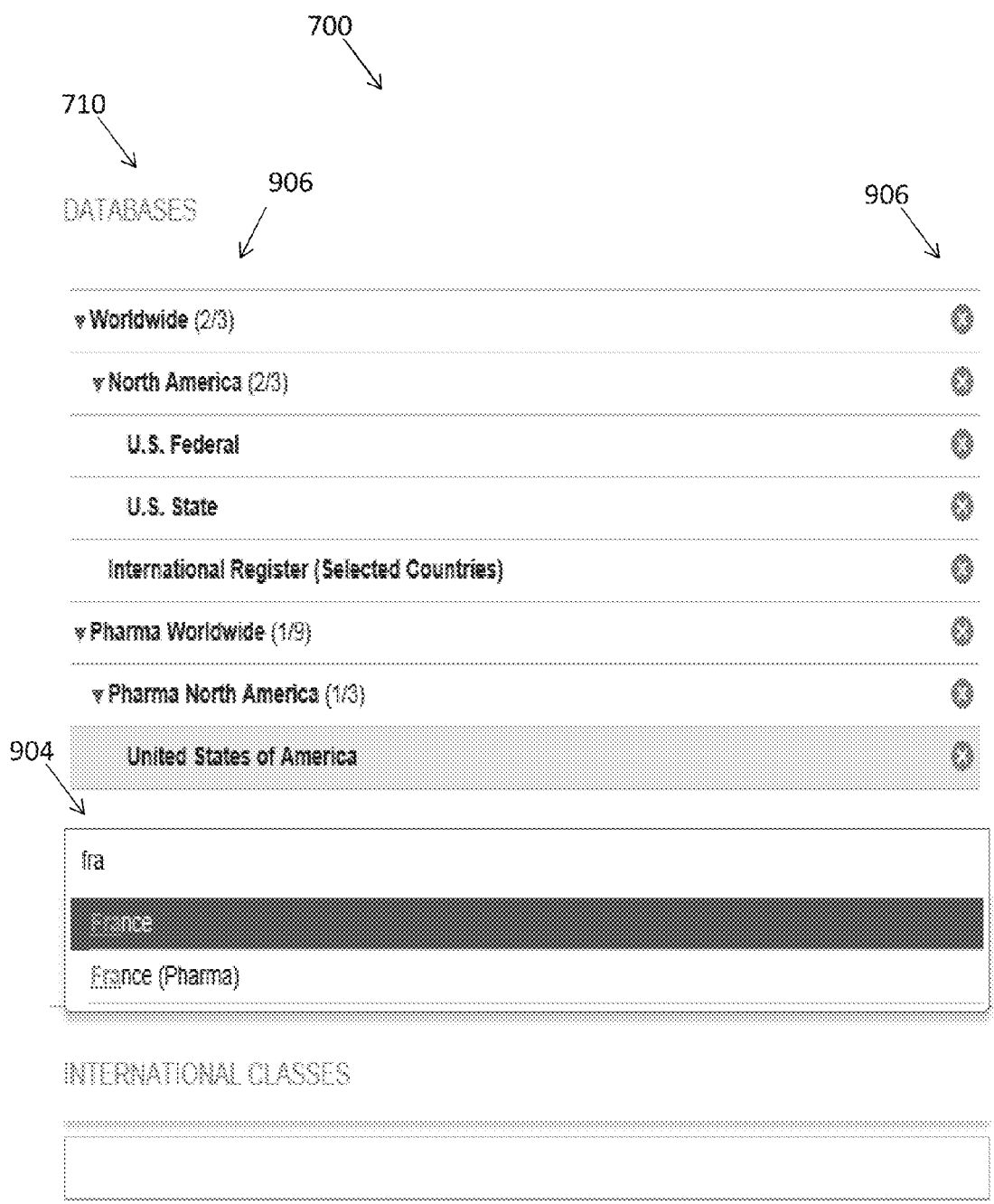
FIG. 9 depicts a portion of a GUI showing a data entry field for repository selection.

FIG. 9 depicts a portion of the GUI 700 showing the data entry field 710 for the repository selection. As shown in FIG. 9, the user has selected repositories 902 for search and is entering text 904 to add another repository to the selected repositories 902. The user can remove selected repository by selecting the remove link 906 associated with a respective one of the selected repositories.

FIG. 10 depicts a portion of the GUI 1000 showing the data entry field 714 for the international class selection. As shown in FIG. 10, the user has selected international classes 1002 for search. The user can remove selected repository by selecting the remove link 1004 associated with a respective one of the selected repositories. In exemplary embodiments, the system 200 can suggest additional classes 1006 to be included in the search order based on, for example, a correlation of relationship between the selected classes and other classes that have not yet been selected. After the user has entered the information in GUI 700, the user can select the search button 1008 to instruct the user device to transmit the search order to a distributed server environment, which executes the system 200 as described herein.

Figure 11:
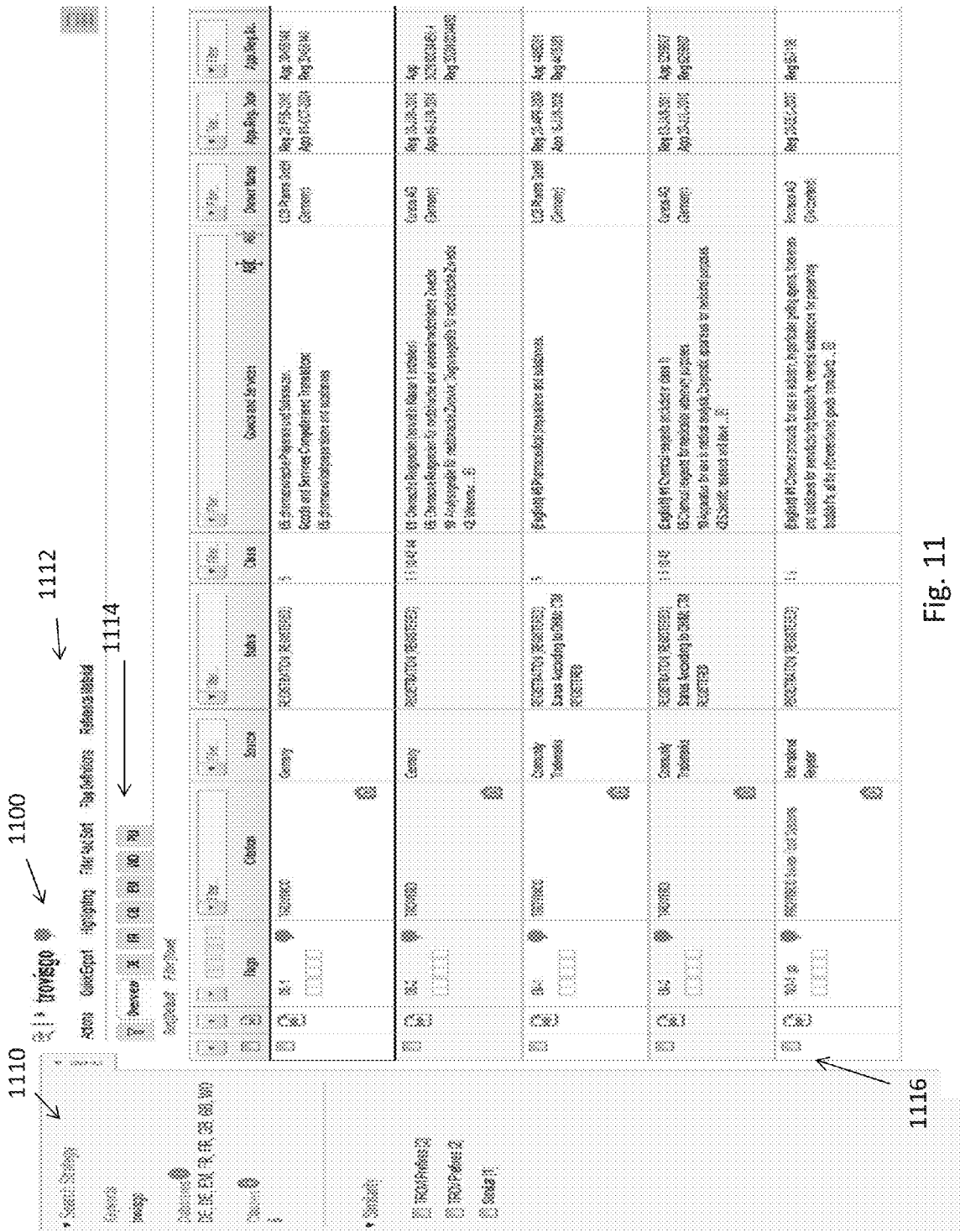
FIG. 11 depicts an exemplary graphical user interface that can be rendered on a display of a user device in response to search results and one or more presentation instructions being transmitted to the user device from the distributed server environment upon completion of a search by the system shown in FIG. 2.

FIG. 11 depicts an exemplary graphical user interface 1100 that can be rendered on a display of a user device in response to search results and one or more presentation instructions being transmitted to the user device from the distributed server environment upon completion of a search by the system 200 or 400 shown in FIGS. 2 and 4. The GUI 1100 can display the search strategy 1110 used by the system 200 to retrieve results 1116. As shown in FIG. 11, the user select different options 1112 to control a presentation of the results in the GUI 1100 and/or to initiate one or more actions. The results 1116 can be listed in the GUI 1100 according to the jurisdiction or repository from which the results are received. For example, the user can select tabs 1114 to view the results by jurisdiction or repository.

Figure 12:
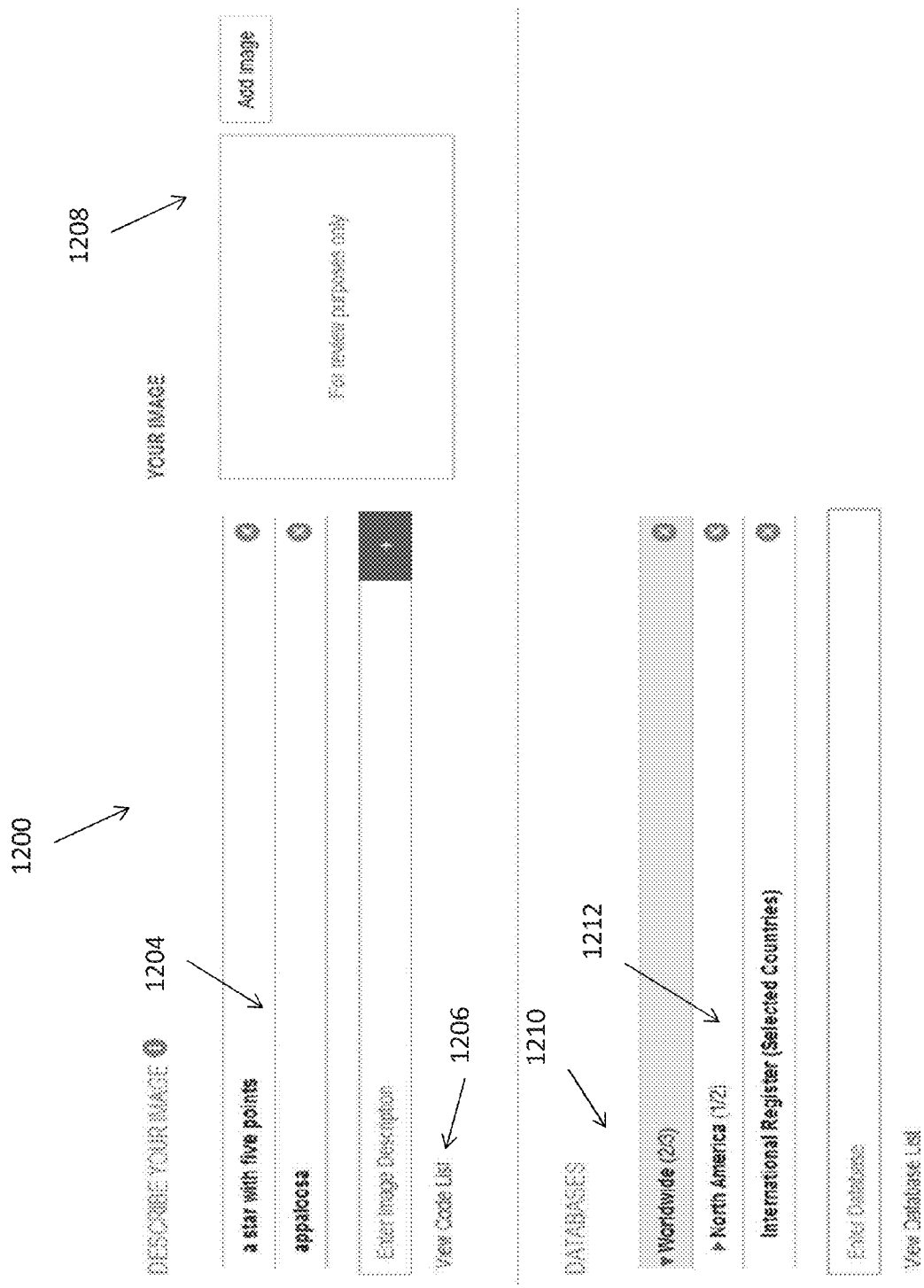
FIG. 12 depicts an exemplary graphical user interface that can be rendered on a display of a user device in response to data and one or more instructions being transmitted to the user device in response to an execution of the system shown in FIG. 3.
Figure 12:
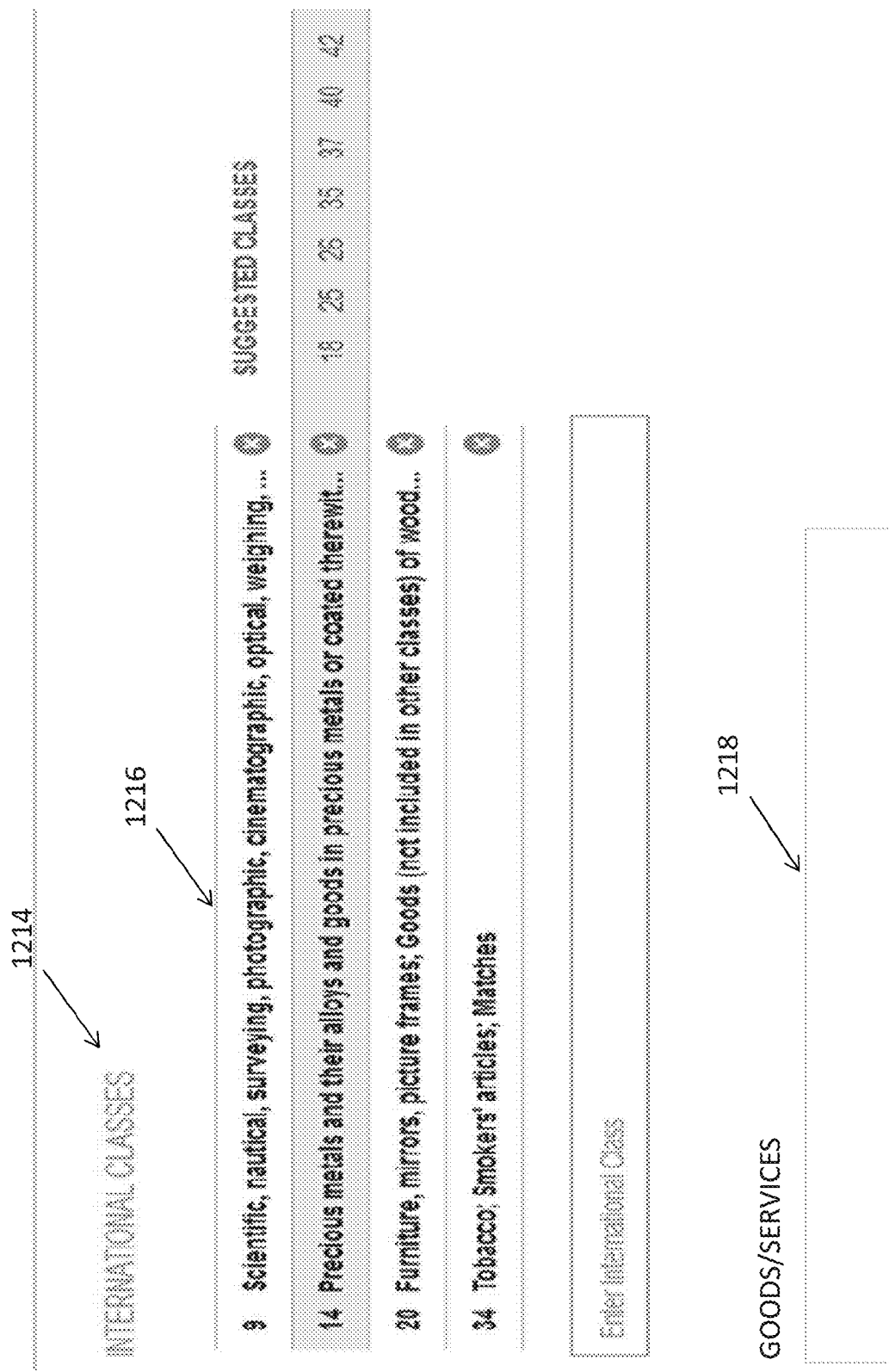

FIG. 12 depicts an exemplary graphical user interface 1200 that can be rendered on a display of a user device in response to data and one or more instructions being transmitted to the user device in response to an execution of the system 300 or 400 shown in FIGS. 3-4. For example, to begin the user can select to search for trademark images by selecting a link to navigate to the GUI 1200 for trademark image searching (e.g., link 704 shown in FIG. 7).

The GUI 1200 can include data entry fields 1202, 1210, and 1214. The data entry field 1202 is provided by the GUI 1200 to allow the user to enter a description 1204 of an image for which confusingly similar results are desired (e.g., "a star with five points", "appaloosa"). The user can also select the link 1206 to navigate to a GUI that displays code lists for describing images. In some embodiments, the user can add the image being described in the data entry field 1202. For example the user can select an add image button 1208 to upload an image to the GUI 1200. The data entry field 1210 is provided by the GUI 1200 to allow the user to specify which repositorirs 1212 the user wishes to have the system 300 or 400 search, which can be implemented, for example, as described with reference to data entry field 710 of FIGS. 7-9. The data entry field 1214 is provided by the GUI 1200 to allow the user to specify which international classes 1216 the user would like to include in the search (e.g., based on the type of goods or services that are or will be associated with the terms entered in the data entry field 1202. The data entry field 1214 can be implemented, for example, as described with reference to data entry field 710 of FIGS. 7 and 10. The data entry field 1218 is provided by the GUI 1200 to allow the user to specify goods or services that are or will be associated with the terms entered in the data entry field 1202, and which can be expanded upon by the system as well as used by the system to identify and return marks that may be confusingly similar to the terms provided in the data entry field 1202.

Figure 13:
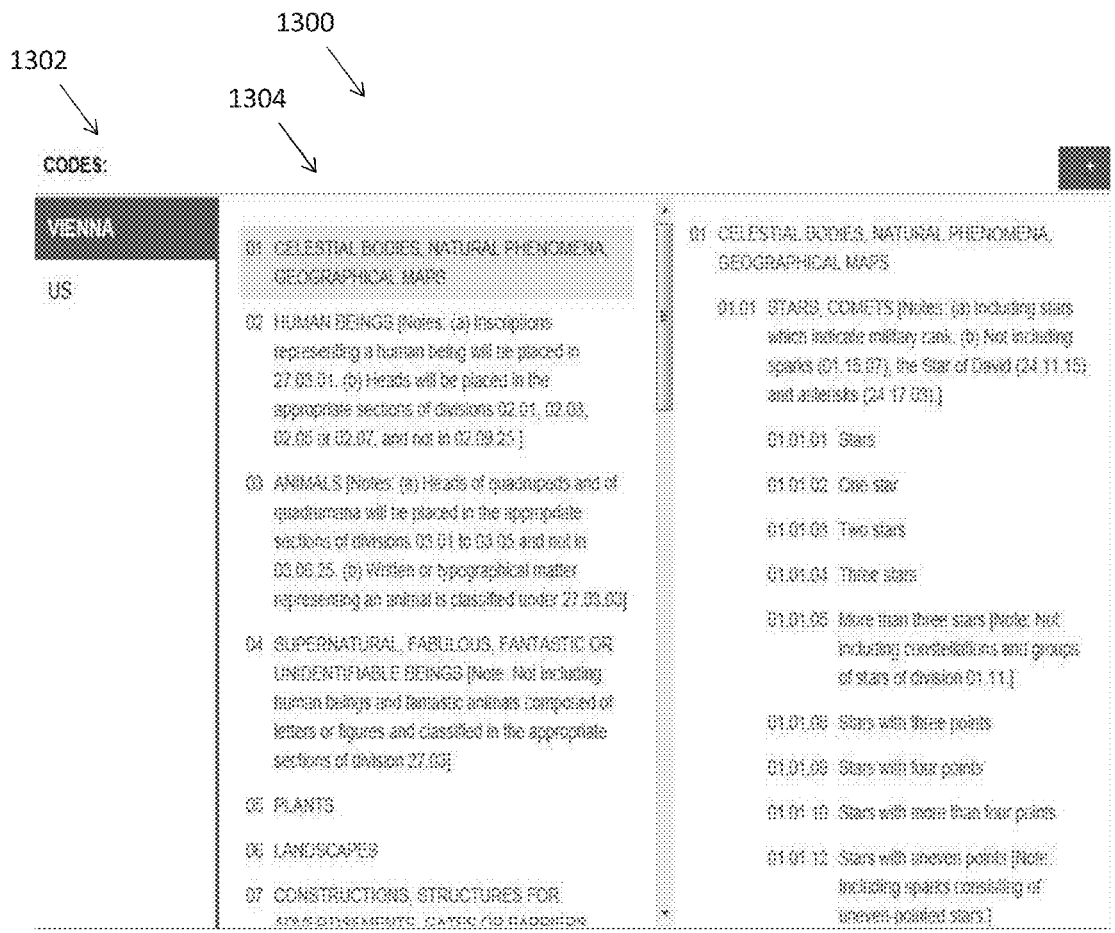
FIG. 13 depicts an exemplary graphical user interface that can be rendered on a display of a user device to provide a list of selectable codes that can be included in the order.

FIG. 13 depicts an exemplary graphical user interface 1300 that can be rendered on a display of a user device to provide a list 1304 of selectable codes that can be included in the order. As shown in FIG. 13, the GUI 1300 can include links 1302, which can be selected by the user to provide lists of codes by code source (e.g., Vienna, U.S.). For example, FIG. 13 shows codes associated with trademark image repositories for the Vienna coding scheme. To include the codes listed in the GUI 1300 in a search order, the user can select the codes from the list 1304. This allows a user to browse the code book from which the rules and retrieval logic were derived to gain some insight on what is known on a concept level or to directly select a set of codes to be retrieved.

Figure 14:
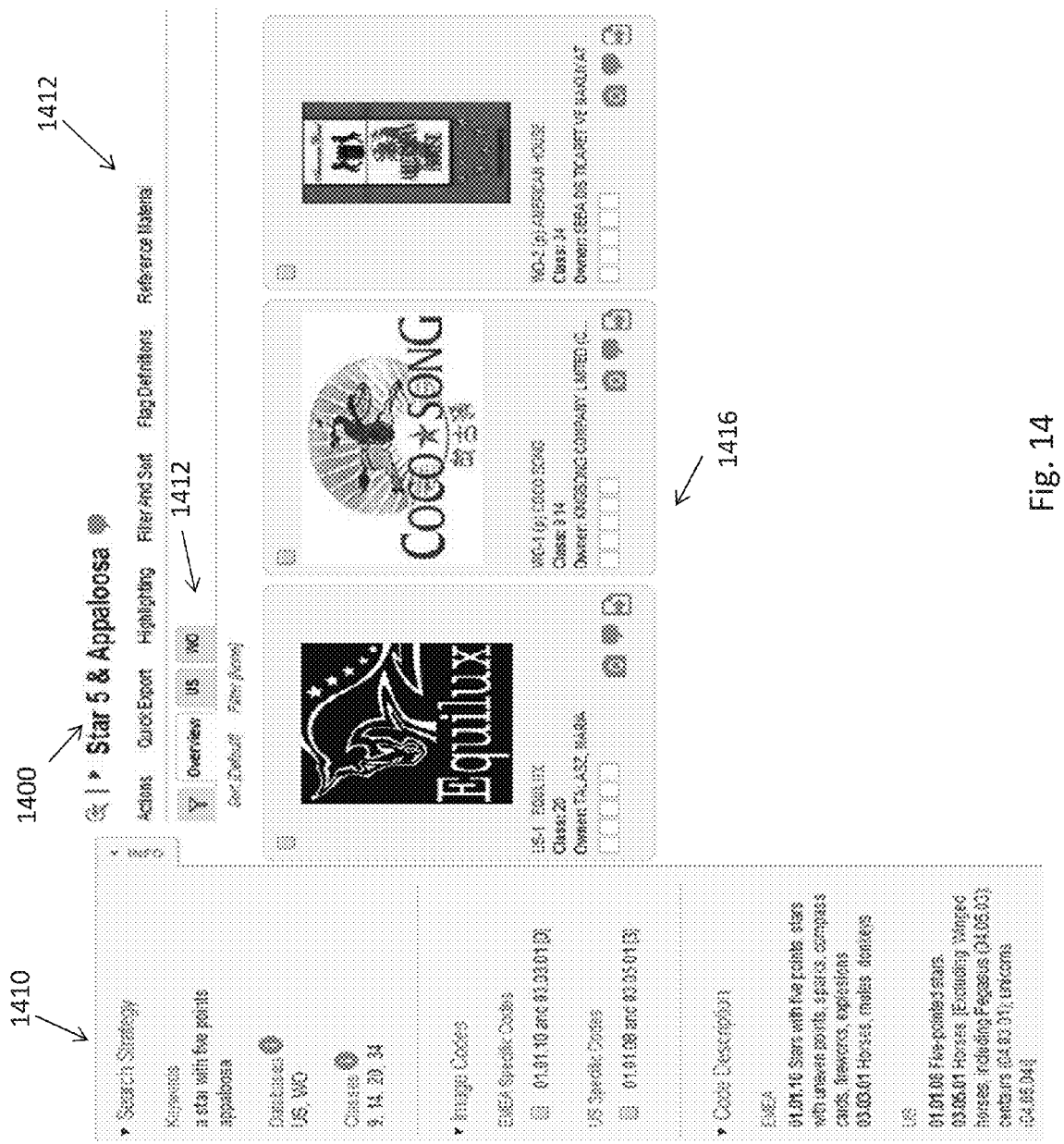
FIG. 14 depicts an exemplary graphical user interface that can be rendered on a display of a user device in response to data and one or more presentation instructions being transmitted to the user device from a distributed server environment executing the information retrieval system shown in FIG. 3.

FIG. 14 depicts an exemplary graphical user interface 1400 that can be rendered on a display of a user device in response to data and one or more presentation instructions being transmitted to the user device from the distributed server environment executing the system 300 shown in FIG. 3. The GUI 1400 can display the search strategy 1410 used by the system 300 to retrieve results 1416. As shown in FIG. 14, the user select different options 1412 to control a presentation of the results in the GUI 1400 and/or to initiate one or more actions. The results 1416 can be listed in the GUI 1100 according to the jurisdiction or repository from which the results are received. For example, the user can select tabs 1414 to view the results by jurisdiction or repository. As shown in FIG. 14, the retrieved images for the desired registered trademark repositories and international classes correspond to the running example of the order "a star with five points", "appaloosa". All three images have a horse (not necessarily an appaloosa as this was mapped onto the concept of a horse because the encoding is not more specific) and one or more five pointed stars.

Figure 15:
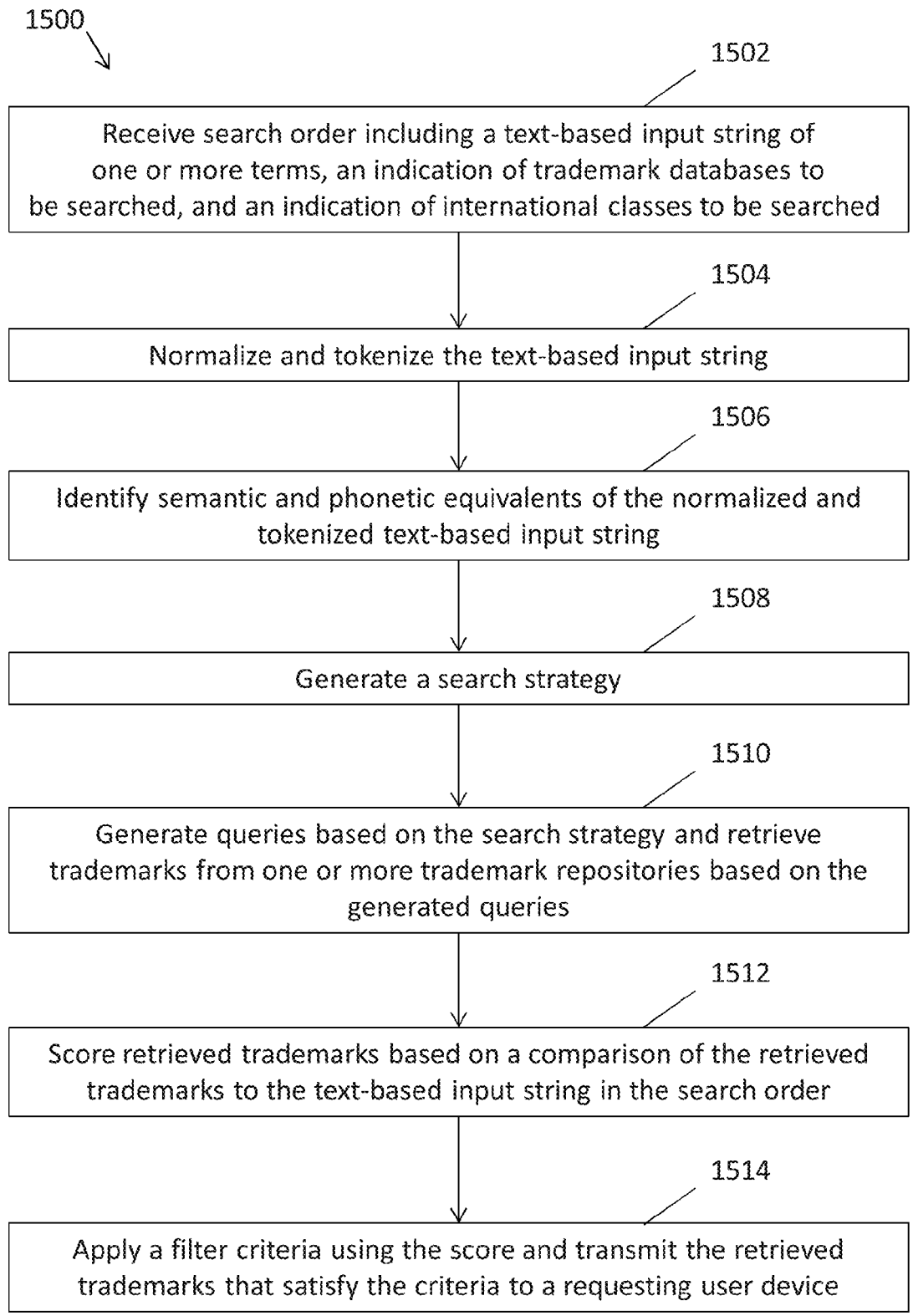
FIG. 15 is a flowchart illustrating an exemplary process that can be performed by an information retrieval system in accordance with exemplary embodiments of the present disclosure to search for and retrieve word marks from one or more trademark repositories.

FIG. 15 is a flowchart illustrating an exemplary process 1500 performed by an information retrieval system in accordance with exemplary embodiments of the present disclosure to search for and retrieve word marks from one or more trademark repositories. At step 1502, a server in a distributed server environment receives a search order including a text-based input string of one or more terms, an indication of trademark repositories to be searched, an indication of international classes to be searched, and an indication of goods/services to be associated with the text-based input string. In response to receiving the search order, one or more servers can execute components of the information retrieval system (e.g., information retrieval system 200 shown in FIG. 2). At step 1504, the information retrieval system normalize and tokenize the text-based input string, and at step 1506, the information retrieval system can identify semantic and phonetic equivalents of the normalized and tokenized text-based input string.

At step 1508, the information retrieval system can generate a search strategy, which defines the manner with which the order will processed to retrieve and filter results. At step 1510, the information retrieval system generates one or more queries in one or more query or programming languages based on the search strategy and retrieves trademarks from one or more trademark repositories based on the generated queries. At step 1512, the trademarks returned in response to the queries are scored based on a comparison of the trademarks to the text-based input string in the search order, and at step 1514, the trademarks having a score that satisfy a filtering criteria are transmitted to the user device by one of the servers in the distributed server environment with presentation instructions for rendering the trademarks in a graphical user interface on a display of the user device. The trademarks transmitted to the user device can be the trademarks that the information retrieval system deemed to be confusingly similar to the text-based input string received in the search order.

Figure 16:
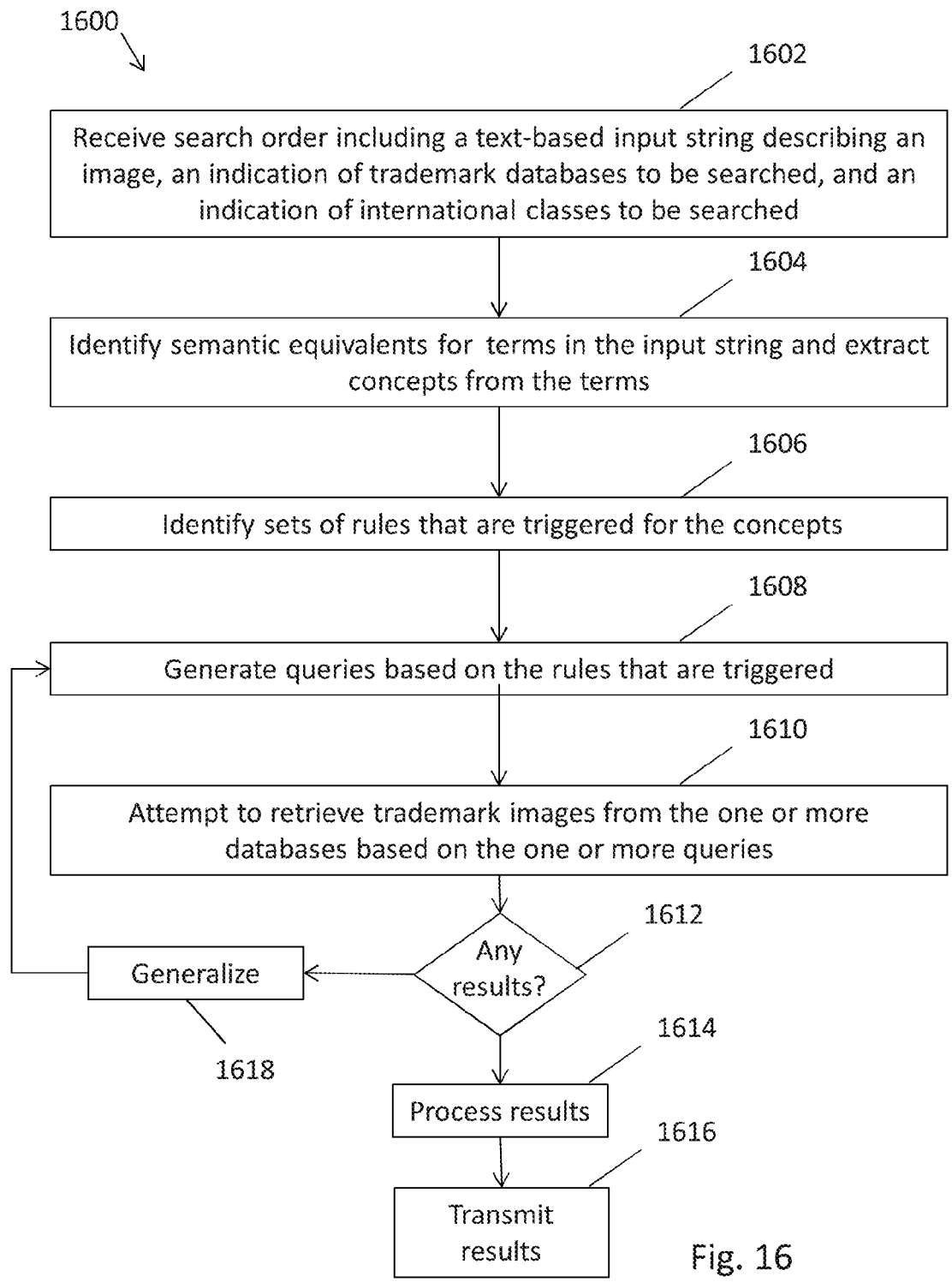
FIG. 16 is a flowchart illustrating an exemplary process performed by an information retrieval system in accordance with exemplary embodiments of the present disclosure to search for and retrieve trademark images from one or more trademark repositories.

FIG. 16 is a flowchart illustrating an exemplary process 1600 performed by an information retrieval system in accordance with exemplary embodiments of the present disclosure to search for and retrieve trademark images from one or more trademark repositories. At step 1602, a server in a distributed server environment receives a search order including a text-based input string of one or more terms describing an image, an indication of trademark repositories to be searched, an indication of international classes to be searched, and an indication of goods/services to be associated with the text-based input string. In response to receiving the search order, one or more servers can execute components of the information retrieval system (e.g., information retrieval system 300 shown in FIG. 3). At step 1604, the information retrieval system can identify semantic equivalents for the one or more terms and can extract one or more concepts from the one or more terms. At step 1606, the information retrieval system can identify one or more sets of rules that are triggered for each concept included in the search order, and at step 1608, the information retrieval system can generate one or more queries in one or more query or programming languages based on the rules that are triggered. The one or more queries can include low level retrieval codes connected by logical connectors (e.g., AND, OR, NOR, NAND).

At step 1610, the information retrieval system attempts to retrieve trademark images from the one or more repositories, and at step 1612, the information retrieval system determines whether any results are returned in response to the generated queries. If no results are returned, at step 1614, the information retrieval system executes the query generalizer to identify other sets of rules that can be used to form new queries based on the names of the rules that were previously used to form the queries and/or alters the logically connectors between query terms, and the process repeats from step 1608. The degree to which the queries are generalized and the number of generalization iterations to be performed can be controlled based on one or more parameters (e.g., a number of levels, L, and a variation of elements, E). When the information retrieval system exhausts the number of iterations without receiving any returns or successfully retrieves at least one trademark image from the one or more repositories, the process proceeds to step 1614 where the results are processed for presentation. In the event that no results are return (even after query generalization), a message can be output to the user to indicate that no results were found. However, if results were found, the information retrieval system groups the results based on metadata associated with the returned trademark images as well as image data associated with the returned trademark images (e.g., color data) at step 1616, and the results are transmitted to the user device by one of the servers in the distributed server environment with presentation instructions for visually rendering the trademarks in a graphical user interface on a display of the user device. The trademarks transmitted to the user device can be the trademarks that the information retrieval system deemed to be confusingly similar to the text-based input string received in the search order.

Figure 17:
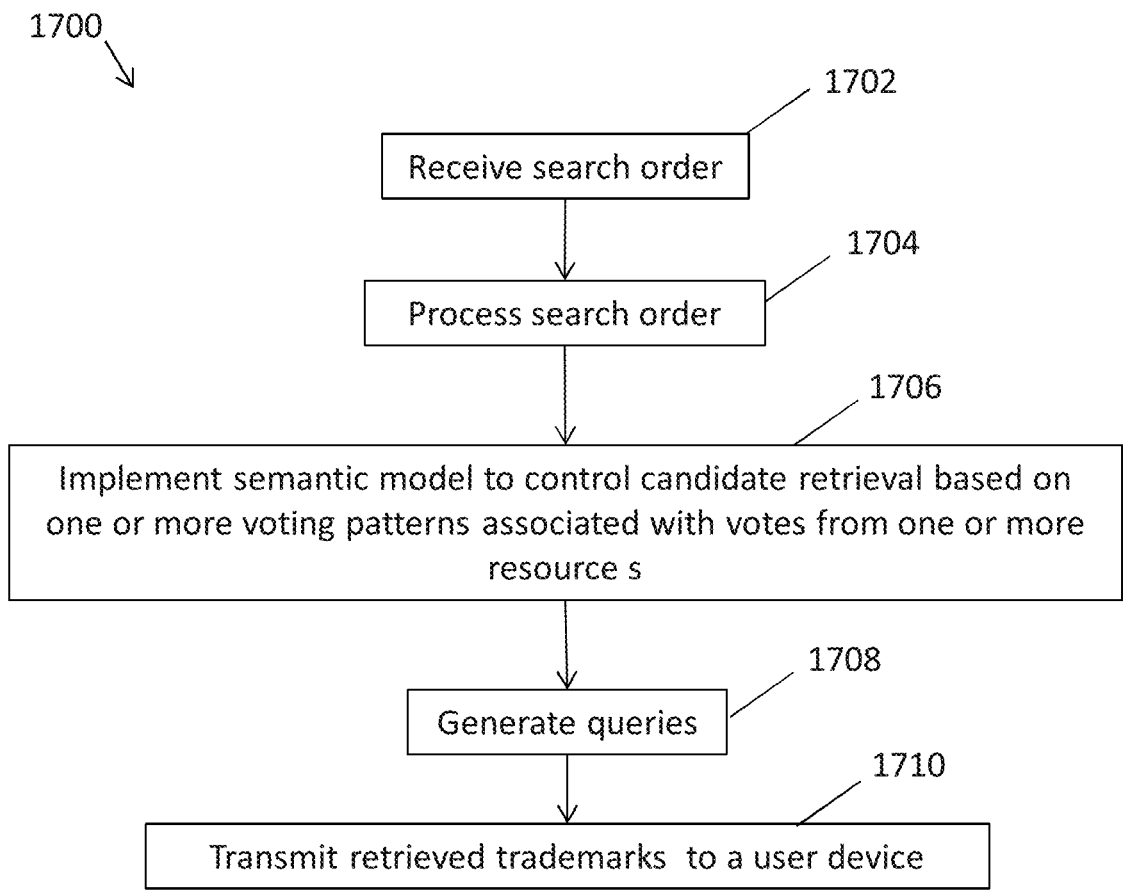
FIG. 17 is a flowchart illustrating an exemplary process that can be performed by an information retrieval system in accordance with exemplary embodiments of the present disclosure to search for and retrieve trademarks from one or more trademark repositories using a semantic model.

FIG. 17 is a flowchart illustrating an exemplary process 1700 performed by an information retrieval system in accordance with exemplary embodiments of the present disclosure to search for and retrieve word marks from one or more trademark repositories. At step 1702, a server in a distributed server environment receives a search order including a text-based input string of one or more terms, an indication of trademark repositories to be searched, an indication of international classes to be searched, and an indication of goods/services to be associated with the text-based input string. In response to receiving the search order, one or more servers can execute components of the information retrieval system (e.g., information retrieval system 400 shown in FIG. 4). At step 1704, the information retrieval system processes the order, and at step 1706, the information retrieval system implements a semantic model to control candidate retrieval based on one or more voting patterns associated with votes from one or more resources to indicated a semantical relatedness of one or more terms in the search order to one or more other terms. At step 1708, the information retrieval system generates one or more queries in one or more query or programming languages based on the voting patterns and retrieves (confusingly similar) trademarks from one or more trademark repositories based on the generated queries. At step 1710, the (confusingly similar) trademarks returned in response to the queries are transmitted to the user device.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps may be replaced with a single element, component or step. Likewise, a single element, component or step may be replaced with a plurality of elements, components or steps that serve the same purpose. Moreover, while example embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Example flowcharts are provided herein for illustrative purposes and are non-limiting examples of methods. One of ordinary skill in the art will recognize that example methods may include more or fewer steps than those illustrated in the example flowcharts, and that the steps in the example flowcharts may be performed in a different order than the order shown in the illustrative flowcharts.

The invention claimed is:

1. A method of extracting confusingly similar trademarks from one or more repositories comprising:
receiving, by one or more servers, an electronic search order including a text-based input string, a list of jurisdictions, and a list of international classes;
executing conditional logic of one or more rules to process the search order;
transforming the search order into one or more queries based on execution of the conditional logic of the one or more rules;
retrieving a set of trademarks from the one or more repositories using the one or more queries to generate search results, the set of trademarks retrieved being limited to the list of jurisdictions and the list of international classes; and transmitting, via a communication network, at least a portion of the search results to a user computing device to be rendered in a graphical user interface of a display device associated with the user computing device, wherein transforming the search order into one or more queries comprises:

identifying visual, phonetic, morphological, translation and semantic close similar variants of the text-based input string in response to execution of the conditional logic;

transforming the search order into a search strategy including one or more directives for processing the search order based on execution of the conditional logic and the visual, phonetic, morphological, translation and/or semantic close similar variants; and interpreting the one or more directives of the search strategy to transform the search strategy into the one or more queries.

2. The method of claim 1, further comprising:

determining whether each of the trademarks retrieved from the one or more repositories satisfies a filtering criteria, and wherein transmitting at least a portion of the search results comprises transmitting the trademarks that satisfy the filtering criteria.

3. The method of claim 2, wherein determining whether each of the trademarks retrieved from the one or more repositories satisfies a filtering criteria comprises:

comparing each of the trademarks to the text-based input string;

generating a similarity score for each of the trademarks in response to the comparing; and comparing each of the similarity scores to a similarity score threshold, wherein the trademarks having a similarity score exceeding the similarity score threshold are transmitted to the user computing device.

4. The method of claim 1, wherein the text-based input string describes an image, and the method further comprises:

identifying recognized words in the text-based input string; and mapping the recognized words onto a set of concepts corresponding to trademark images.

5. A method of extracting confusingly similar trademarks from one or more repositories comprising:

receiving, by one or more servers, an electronic search order including a text-based input string, a list of jurisdictions, and a list of international classes;

executing conditional logic of one or more rules to process the search order;

transforming the search order into one or more queries based on execution of the conditional logic of the one or more rules;

retrieving a set of trademarks from the one or more repositories using the one or more queries to generate search results, the set of trademarks retrieved being limited to the list of jurisdictions and the list of international classes; and transmitting, via a communication network, at least a portion of the search results to a user computing device to be rendered in a graphical user interface of a display device associated with the user computing device, wherein the text-based input string describes an image, and the method further comprises:

identifying recognized words in the text-based input string; and mapping the recognized words onto a set of concepts corresponding to trademark images; and wherein transforming the search order into one or more queries based on execution of the conditional logic comprises:

executing a rule matcher to identify which of the one or more rules apply to query generation based on one or more concepts extracted from the text based input string;

executing the one or more rules identified by the rule matcher to transform the search order into the one or more queries;

extracting one or more low level codes associated with trademark images stored in the one or more repositories based on executing the identified one or more rules; and forming the one or more queries based on the one or more low level codes.

6. The method of claim 5, further comprising:

determining that the set of trademarks is a null set;

generalizing the one or more rules used to generate the one or more queries; and generating one or more new queries based on generalizing the one or more rules.

7. The method of claim 6, wherein generalizing the one or more rules comprises:

determining that a further set of trademarks returned in response to the one or more new queries is a null set; and further generalizing the one or more rules used to generate the one or more new queries.

8. The method of claim 6, wherein the one or more rules are generalized for a specified number of terms in the one or more queries to generate the one or more new queries.

9. A system of extracting confusingly similar trademarks from one or more repositories comprising:

one or more non-transitory computer-readable media configured as one or more repositories storing trademarks and metadata associated with the trademarks;

one or more rule bases including rules formed by conditional logic, the one or more rule bases being stored in memory of one or more computing devices that are configured as servers; and a distributed server environment including the servers operatively coupled to each other via a communication network, the servers being configured to interact with the one or more repositories and one or more rule bases stored in the memory and being collectively programmed to:

receive an electronic search order including a text-based input string, a list of jurisdictions, and a list of international classes;

execute conditional logic of one or more of the rules in the one or more rule bases to process the search order;

transform the search order into one or more queries based on execution of the conditional logic;

retrieve a set of trademarks from the one or more repositories using the one or more queries to generate search results, the set of trademarks retrieved being limited to the list of jurisdictions and the list of international classes; and transmit at least a portion of the search results to a user computing device to be rendered in a graphical user interface of a display device associated with the user computing device, wherein the servers are further collectively programmed to transform the search order into one or more queries by:
  identifying visual, phonetic, morphological, translation or semantic close similar variants of the text-based input string in response to execution of the conditional logic;
  transforming the search order into a search strategy including one or more directives for processing the search order based on execution of the conditional logic and the visual, phonetic, morphological, translation or semantic close similar variants; and
  interpreting the one or more directives of the search strategy to transform the search strategy into the one or more queries.

10. The system of claim 9, wherein the servers are collectively programmed to:
  determine whether each of the trademarks retrieved from the one or more repositories satisfies a filtering criteria, wherein transmission of at least a portion of the search results comprises transmission of the trademarks that satisfy the filtering criteria.

11. The system of claim 10, wherein the servers are collectively programmed to determine whether each of the trademarks retrieved from the one or more repositories satisfies a filtering criteria by:
  comparing each of the trademarks to the text-based input string;
  generating a similarity score for each of the trademarks in response to the comparing; and
  comparing each of the similarity scores to a similarity score threshold,
  wherein the trademarks having a similarity score exceeding the similarity score threshold are transmitted to the user computing device.

12. The system of claim 9, wherein the text-based input string describes an image, and the servers are collectively programmed to:
  identify recognized words in the text-based input string; and
  map the recognized words onto a set of concepts corresponding to trademark images.

13. A system of extracting confusingly similar trademarks from one or more repositories comprising:
  one or more non-transitory computer-readable media configured as one or more repositories storing trademarks and metadata associated with the trademarks;
  one or more rule bases including rules formed by conditional logic, the one or more rule bases being stored in memory of one or more computing devices that are configured as servers; and
  a distributed server environment including the servers operatively coupled to each other via a communication network, the servers being configured to interact with the one or more repositories and one or more rule bases stored in the memory, and being collectively programmed to:
    receive an electronic search order including a text-based input string, a list of jurisdictions, and a list of international classes;
    execute conditional logic of one or more of the rules in the one or more rule bases to process the search order;
    transform the search order into one or more queries based on execution of the conditional logic;
    retrieve a set of trademarks from the one or more repositories using the one or more queries to generate search results, the set of trademarks retrieved being limited to the list of jurisdictions and the list of international classes; and
    transmit at least a portion of the search results to a user computing device to be rendered in a graphical user interface of a display device associated with the user computing device,
  wherein the text-based input string describes an image, and the servers are collectively programmed to:
    identify recognized words in the text-based input string; and
    map the recognized words onto a set of concepts corresponding to trademark images; and
  wherein the servers are collectively programmed to transform the search order into one or more queries based on execution of the conditional logic by:
    executing a rule matcher to identify which of the one or more rules apply to query generation based on one or more concepts extracted from the text based input string;
    executing the one or more rules identified by the rule matcher to transform the search order into the one or more queries;
    extracting one or more low level codes associated with trademark images stored in the one or more repositories based on executing the identified one or more rules; and
    forming the one or more queries based on the one or more low level codes.

14. The system of claim 13, wherein the servers are collectively programmed to:
  determine that the set of trademarks is a null set;
  generalize the one or more rules used to generate the one or more queries; and
  generate one or more new queries based on generalizing the one or more rules.

15. The system of claim 14, wherein the servers are collectively programmed to generalize the one or more rules by:
  determining that a further set of trademarks returned in response to the one or more new queries is a null set; and
  further generalizing the one or more rules used to generate the one or more new queries.

16. The system of claim 14, wherein the one or more rules are generalized for a specified number of terms in the one or more queries to generate the one or more new queries.

17. A non-transitory computer readable medium storing instruction that are executable by one or more processing devices, where execution of the instructions by the one or more processing devices causes the one or more processing devices to:
  receive an electronic search order including a text-based input string, a list of jurisdictions, and a list of international classes;
  execute conditional logic of one or more rules in one or more rule bases to process the search order;
  transform the search order into one or more queries based on execution of the conditional logic;
  retrieve a set of trademarks from the one or more repositories using the one or more queries to generate search results, the set of trademarks retrieved being limited to the list of jurisdictions and the list of international classes; and
  transmit at least a portion of the search results to a user computing device to be rendered in a graphical user interface of a display device associated with the user computing device, wherein transformation of the search order into one or more queries based on execution of the conditional logic by:

executing a rule matcher to identify which of the one or more rules apply to query generation based on one or more concepts extracted from the text based input string;

executing the one or more rules identified by the rule matcher to transform the search order into the one or more queries;

extracting one or more low level codes associated with trademark images stored in the one or more repositories based on executing the identified one or more rules; and forming the one or more queries based on the one or more low level codes.

* * * * *